United States Patent
Olof-Ors et al.

(10) Patent No.: US 10,394,837 B2
(45) Date of Patent: Aug. 27, 2019

(54) DIGITAL COMMUNICATIONS INTERFACE AND GRAPHICAL USER INTERFACE

(71) Applicant: Thomson Reuters Global Resources Unlimited Company, Baar (CH)

(72) Inventors: Mans Olof-Ors, Zug (CH); Marc Kukura, Oberwil b Zug (CH); Sam Chadwick, Zug (CH); Enav Weinreb, Petah Tikva (IL); Peter Pircher, Baar (CH)

(73) Assignee: Refinitiv US Organization LLC, New York, NY (US)

( * ) Notice: Subject to any disclaimer, the term of this patent is extended or adjusted under 35 U.S.C. 154(b) by 961 days.

(21) Appl. No.: 14/926,591

(22) Filed: Oct. 29, 2015

(65) Prior Publication Data
US 2016/0154856 A1    Jun. 2, 2016

Related U.S. Application Data

(60) Provisional application No. 62/073,058, filed on Oct. 31, 2014.

(51) Int. Cl.
*G06F 17/30* (2006.01)
*G06F 16/248* (2019.01)
*G06F 16/2457* (2019.01)

(52) U.S. Cl.
CPC ...... *G06F 16/248* (2019.01); *G06F 16/24578* (2019.01)

(58) Field of Classification Search
CPC .................................................. G06F 17/30
USPC ................................................. 707/723, 728
See application file for complete search history.

(56) References Cited

U.S. PATENT DOCUMENTS

| | | | |
|---|---|---|---|
| 8,918,389 B2 * | 12/2014 | Velipasaoglu | G06F 17/3097 707/723 |
| 2007/0192300 A1 | 8/2007 | Reuther et al. | |
| 2008/0201304 A1 * | 8/2008 | Sue | G06F 17/30696 |
| 2009/0281988 A1 | 11/2009 | Yoo | |
| 2013/0018872 A1 * | 1/2013 | Velipasaoglu | G06F 17/3097 707/723 |

* cited by examiner

*Primary Examiner* — Baoquoc N To
(74) *Attorney, Agent, or Firm* — Duncan Galloway Egan Greenwald, PLLC; Kevin T. Duncan

(57) ABSTRACT

The present invention provides a digital communications system for receiving and integrating multiple service communication feeds into an overall composite deliverable by way of an enhanced and interactive user interface. The system receives peer identification and scoring communications signals from multiple services and based on known handshake configurations links peer identification data to dimensions used to generate an integrated peer identification score and list. A graphical user interface allows users to modify the dimension aggregator function to obtain customizable sets of results based on services communications feeds.

30 Claims, 11 Drawing Sheets

| 48269 | 16268 | 180 | 86753 |
|---|---|---|---|
| News | Case Law | Editorial Analysis | Scholarly Articles |
| Broker Research | Admin Decisions | | Patents |
| Bonds | Public Records | | Trademarks |
| Fundamentals | Dockets | | Domain Names |
| Press Releases | Arbitration | | Clinical Trials |
| | | | Drugs |

FIGURE 5

DIGITAL COMMUNICATIONS INTERFACE AND GRAPHICAL USER INTERFACE

CROSS REFERENCE TO RELATED APPLICATION

The present application claims benefit of priority to U.S. Provisional Application 62/073,058, filed Oct. 31, 2014, entitled Peer Identification Engine, the contents of which are hereby incorporated by reference herein in the entirety.

FIELD OF THE INVENTION

The present invention relates generally to digital communications over a communications network and more specifically to providing services connection between service providers and an integration facility for delivering enhanced peer identification services. The invention further relates to providing a graphical user interface for delivering enhanced peer identification services through an integrated service provider.

BACKGROUND OF THE INVENTION

With the advents of computer-implemented data capturing and processing and mass data storage, the amount of information generated by mankind has risen dramatically and with an ever quickening pace. As a result there is a continuing and growing need to collect and store, identify, track, classify and to assimilate, transform and re-define this growing sea of information for heightened use by humans. As a result, there are many systems presently available that have classified, tagged and organized documents and other records and have linked attributes related to such documents with entities, e.g., patent databases that link patent documents with entities (assignee companies and inventors and patent attorneys and patent examiners) and with classification types (such as IPC classification codes). These systems fail to provide a system for identifying peer entities based on such linking.

In many areas and industries, including the financial and legal sectors and areas of technology, for example, there are content and enhanced experience providers, such as The Thomson Reuters Corporation. Such providers identify, collect, analyze and process key data for use in generating content for consumption by professionals and others involved in the respective industries. Providers in the various sectors and industries continually look for products and services to provide subscribers, clients and other customers and for ways to distinguish their firm's offerings over the competition. Such providers constantly strive to create and provide enhanced tools, including search tools, to enable clients to more efficiently and effectively process information and make informed decisions.

Search engines are used to retrieve information of interest in response to user defined queries or search terms. In many areas and industries, including financial services sector, for example, there are content and enhanced experience providers, such as The Thomson Reuters Corporation, Wall Street Journal, Dow Jones News Service, Bloomberg, Financial News, Financial Times, News Corporation, Zawya, and New York Times. Such providers identify, collect, analyze and process key data for use in generating content, such as reports and articles, for consumption by professionals and others involved in the respective industries, e.g., financial consultants and investors. In one manner of services delivery, these financial news services provide financial news feeds, both in real-time and in archive, that include articles and other reports that address the occurrence of recent events that are of interest to investors. Many of these articles and reports, and of course the underlying events, may have a measurable impact on the pricing and availability of commodities. Moreover, such events may have an impact on peer companies. For example, a company may issue a press release that it (as supplier) has entered into an agreement with an other company (customer) to supply that company with a certain quantity of commodities, goods, or services (commodity). Professionals and providers in the various sectors and industries continue to look for ways to enhance content, data and services provided to subscribers, clients and other customers and for ways to distinguish over the competition. Such providers strive to create and provide enhance tools, including search and visualization tools, to enable clients to more efficiently and effectively process information and make informed decisions.

Advances in technology, including database mining and management, search engines, linguistic recognition and modeling, provide increasingly sophisticated approaches to searching and processing vast amounts of data and documents, e.g., database of news articles, financial reports, blogs, SEC and other required corporate disclosures, legal decisions, statutes, laws, and regulations, that may affect business performance, including pricing and availability of commodities. Investment and other financial professionals and other users increasingly rely on mathematical models and algorithms in making professional and business determinations. Especially in the area of investing, systems that provide faster access to and processing of (accurate) news and other information related to corporate operations performance will be a highly valued tool of the professional and will lead to more informed, and more successful, decision making Information technology and in particular information extraction (IE) are areas experiencing significant growth to assist interested parties to harness the vast amounts of information accessible through pay-for-services or freely available such as via the Internet.

Many financial services providers use "news analysis" or "news analytics," which refer to a broad field encompassing and related to information retrieval, machine learning, statistical learning theory, network theory, and collaborative filtering, to provide enhanced services to subscribers and customers. News analytics includes the set of techniques, formulas, and statistics and related tools and metrics used to digest, summarize, classify and otherwise analyze sources of information, often public "news" information. An exemplary use of news analytics is a system that digests, i.e., reads and classifies, financial information to determine market impact related to such information while normalizing the data for other effects. News analysis refers to measuring and analyzing various qualitative and quantitative attributes of textual news stories, such as that appear in formal text-based articles and in less formal delivery such as blogs and other online vehicles. More particularly, the present invention concerns analysis in the context of electronic content. Expressing, or representing, news stories as "numbers" or other data points enables systems to transform traditional information expressions into more readily analyzable mathematical and statistical expressions and further into useful data structures and other work product. News analysis techniques and metrics may be used in the context of determining similarity between entities. Services provide this information in the form of a service input.

There are known services providing preprocessing of data, entity extraction, entity linking, indexing of data, and for indexing ontologies that may be used in delivery of peer identification services. For example U.S. Pat. No. 7,333,966, entitled "SYSTEMS, METHODS, AND SOFTWARE FOR HYPERLINKING NAMES", U.S. Pat. Pub. 2009/0198678, entitled "SYSTEMS, METHODS, AND SOFTWARE FOR ENTITY RELATIONSHIP RESOLUTION", U.S. patent application Ser. No. 12/553,013, entitled "SYSTEMS, METHODS, AND SOFTWARE FOR QUESTION-BASED SENTIMENT ANALYSIS AND SUMMARIZATION", U.S. Pat. Pub. 2009/0327115, entitled "FINANCIAL EVENT AND RELATIONSHIP EXTRACTION", and U.S. Pat. Pub. 2009/0222395, entitled "ENTITY, EVENT, AND RELATIONSHIP EXTRACTION", the contents of each of which are incorporated herein by reference herein in their entirety, describe systems, methods and software for the preprocessing of data, entity extraction, entity linking, indexing of data, and for indexing ontologies in addition to linguistic and other techniques for mining or extracting information from documents and sources. Incorporated by reference is U.S. Pat. Publ. 2011/0191310 (Liao et al.) entitled METHOD AND SYSTEM FOR RANKING INTELLECTUAL PROPERTY DOCUMENTS USING CLAIM ANALYSIS.

What is needed is a digital communications system for receiving and integrating multiple service communication feeds into an overall composite deliverable by way of an enhanced and interactive user interface.

SUMMARY OF THE INVENTION

In one manner the invention relates to an engine, or Peer Identification Search Engine ("PISE"), for providing a list of entities ranked by similarity for any given entity. In one exemplary manner of operation a user operating a user interface on a remote user device enters a query related to an entity of interest. The query is communicated over a communications network to a digital communications interface ("DIC") associated with the PISE. The PISE processes the query and associates an entity identifier to the entity of interest and via the DIC issues a search request to a plurality of services adapted to render peer identification information, such as lists of peers and related similarity scores. The PISE aggregates into dimensions the peer list and similarity scoring information as delivered or exposed by the underlying services. The search and peer entities may be companies in one domain but the invention is broadly applicable to any entity types. The present invention comprises user interface aggregation and clustering engines that are domain independent, and other embodiments of the present invention may provide similar services for other domains. For example, other embodiment of the present invention may be used to compare people, academic institutions, products, funds, bonds, drugs and others.

Comparing entities for similarity has been a long standing need in the art. In an exemplary embodiment, the present invention may be used in the financial domain where a list of similar companies is presented to customers, such as subscribers to a service or host of services. The present invention provides an engine that can be used by different product groups to create use case specific lists of similar items. One key advantage of the present invention is the flexibility to integrate multiple dimensions into clusters and into a final ranked list by providing for the integration of dimension services written independently by experts of a dimension. Known engines in the art only provide a static implementation of creating a list of similar entities, exemplary such known engines include: the Starmine engine, which creates a list of similar companies by grouping companies covered by the same industry analysts; the Atlas engine, which creates a list of similar private companies by comparing the co-occurrence graph of entities; Reviewer finder can identify reviewers of scientific papers with similar profile to the authors based on publication history; Patents/Trademarks/Intellectual Property—Thomson Innovation services; Google search engines; FreePatentsOnline search engine; USPTO.gov patent and trademark and assignment search engines.

The present invention separates or distinguishes between different dimensions (which may include facets or attributes) and representative service signals to effectively score and cluster entities based on attributes of interest (e.g., financial analyst coverage, patent and trademark holdings or descriptions, legal classifications, industry classifications, financial performance, size of entity based on financial markers (revenues, profitability, number of employees, geographical footprint, product offering, etc.)). The invention may also cluster lists of similar entities and aggregate sets of scores related to similar entities into a readily comparable composite scores. The invention provides a user interface that may be divided into and displayed as a set of layers (e.g., clustering, dimension aggregation, and GUI). The present invention may provide for multiple possible views of the ranked lists based on specific use cases. A variety of dimension services are available, such as those described above, that enable the present invention to be useful and accurate in various domains (e.g., comparing companies, individuals, products, commodities, and comparing academic institutions).

The Starmine and Atlas service engines mentioned above are examples of services that may be included to contribute dimensions into the PISE disclosed herein. EIKON is an exemplary platform for delivering the PISE services of the present invention. The present invention provides for the independent development of engines contributing a facet to the PISE to be aggregated and makes the system highly extensible and flexible. These two attributes also help increase the quality of the system of the present invention as over time the accuracy of the component services can be increased contributing to the overall quality of the ranking list provided by the PISE of the present invention.

The present invention also provides a flexible aggregation component. The flexible aggregation component provides an end user with the ability to pass or input a plurality of entities to the system. The present invention may use the dimension services to receive scores for the different attributes and use these scores to cluster the results into groups. The collective attributes of all member entities of each group may be used to generate additional peers to the group. A user of the system may influence or change the weights of the dimensions to experiment with which clusters (create groups) make most sense for a given use case. The flexibility of the PISE of the present invention provides for the ability to cluster, aggregate and visualize multiple dimensions (or attributes) comparing an item into a single ranked similarity list. The present invention allows the user to adjust weights of the dimension scores to allow a user to individually decide what aspects of an item are important or to re-emphasize dimensions.

The present invention may also provide services with a "learn by example" mode. A single company or multiple companies may be passed to the system. The present invention adjusts the weights of the dimensions to return the overall list such that the query items (items passed to the system) are included as a subset of the items returned. When the user adjusts the dimensions or the results returned to the user, the PISE system essentially provides this user interaction as feedback the underlying service may use to refine the underlying proprietary service algorithm.

A first embodiment of the present invention provides a computer-based system connected via a communications network to a remote user device and a plurality of services. The system comprises a digital communications interface having: an input adapted to receive from a remote user device via the digital communications network a query; an entity identification module adapted to identify within the query an entity and associate an entity identifier with the identified entity; an output adapted to transmit the entity identifier to a plurality of service providers; the input further adapted to receive from each of the plurality of service providers a set of peer information, each set of peer information comprising a list of peers and a set of similarity scores and having an associated set of attributes, each set of peer information being determined based on separate peer determination models and on the entity identifier. The system further comprises a dimension aggregation engine adapted to compute an aggregated list of peers and a corresponding set of overall similarity scores based on aggregating all of the received sets of peer information associated with the entity; and a graphic user interface adapted to present a graphic representation of the aggregated list of peers based on the computed set of overall similarity scores associated with the entity on a display device associated with the remote user device.

The system may be further characterized as follows: wherein the entity identifier represents one from a group consisting of: a public company, a private company, a client, a customer, a person, an office of a company, a person having a defined role with an entity; wherein the input is adapted to receive a query comprising a set of entities, and further comprising a clustering engine adapted transmit a set of entity identifiers to the plurality of service providers; wherein the input is adapted to receive an input from a graphical user interface element; the dimension aggregation engine is adapted to modify the overall similarity scores based on the input received from the graphical user interface element and generate a modified overall similarity score; and the graphic user interface is adapted to present a modified list of peers based on the modified overall similarity scores; wherein the graphical user interface element is one of the group consisting of: a bar graph; a slide; a check box; a virtual dial; and a numerical input box; wherein the graphical representation includes an overall similarity score representation for each peer entity in the list of peers and each overall similarity score representation includes a representation of the set of dimension scores included in the overall similarity score; wherein the graphical user interface includes a sub-dimension user interface element adapted to allow a user to open a view related to at least one of the set of dimension scores; wherein the input is adapted to receive an input from the sub-dimension graphical user interface element; the dimension aggregation engine is adapted to modify the overall similarity scores based on the input received from the sub-dimension graphical user interface element and generate a modified overall similarity score; and the graphic user interface is adapted to present a modified list of peers based on the modified overall similarity scores; wherein the digital communications interface is adapted to communicate to one or more of the services user inputs received via the graphical user interface indicating a feedback based on the list of peers presented via the remote user device, the feedback for use by the one or more services in a learning mode; wherein the plurality of services includes two or more from the group of service types consisting of: corporate fundamentals, patent classification, trademark classification, business classification, financial analyst coverage, individual authority database.

A second embodiment of the present invention provides a digital communications system for determining a set of peer entities related to an input entity, the digital communications system comprising: a server having a processor and a memory and being connected to a network communications interface for communicating with remote devices over a communications network, the server adapted to execute instructions; an input operably connected to the server and adapted to receive an input signal from a remote user device via the communications network, the input signal representing an input search query for an entity of interest; a handshake module adapted to map each one of the set of service providers to a respective set of dimensions based on technical contract data associated with each respective service provider; a dimension aggregator adapted to receive a plurality of service input signals and to link the plurality of service input signals to one or more dimensions based on the mapped set of dimensions, the dimension aggregator further adapted to normalize each of the signals received from the set of service providers resulting in a set of normalized service signals and to aggregate the set of normalized service signals to determine a set of overall peer similarity scores based on a set of aggregator dimensions and to produce an aggregated set of peer entities; a graphical user interface module adapted to generate a graphical user interface for display via a remote user device connected to the server via the network interface, the graphical user interface including a section for displaying the aggregated set of peer entities and including an element adapted for user manipulation to change one or more attributes associated with the set of dimensions, wherein upon receiving an input signal from the remote user device as a result of a user manipulation the dimension aggregator produces a modified aggregated set of peer entities.

A third embodiment of the present invention provides a digital communications interface in electrical communication with a plurality of service providers via a communications network and connected to a computer-based peer identification system having an input for receiving an input query from a remote user device for determining a set of peer entities related to the input entity, the digital communications interface comprising: a service communications interface adapted to send a request signal representing an entity derived from the input query to each of a set of service providers to initiate a search for peer entities related to the entity, and further adapted to receive a response signal from each of the set of service providers in response to the request signal, each response signal representing a resulting set of peer data generated respectively by the set of service providers based on the entity and a set of service dimensions included in a technical contract for each of the set of service providers; a handshake module adapted to map each one of the set of service providers to a respective set of dimensions based on technical contract data associated with each respective service provider; a service signal normalization module adapted to normalize each of the signals received from the set of service providers resulting in a set of normalized service signals; a dimension aggregation engine adapted to aggregate the set of normalized service signals to determine a set of overall peer identification scores based on a set of aggregator dimensions and to produce an aggregated set of peer entities; a graphical user interface adapted to generate a graphical user interface for display via a remote user device connected to the peer identification system, the graphical user interface including a section for displaying the aggregated set of peer entities based on the set of overall peer identification scores and including an element adapted for user manipulation to generate a user manipulation signal, whereby in response to the user manipulation signal the dimension aggregator produces a modified set of overall peer identification scores different that the set of overall peer identification scores.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 5 is an exemplary representation of a set of dimensions used in accordance with the present invention PISE system;

DETAILED DESCRIPTION OF THE INVENTION

The present invention will now be described in more detail with reference to exemplary embodiments as shown in the accompanying drawings. While the present invention is described herein with reference to the exemplary embodiments, and particularly with reference to peer detection services, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
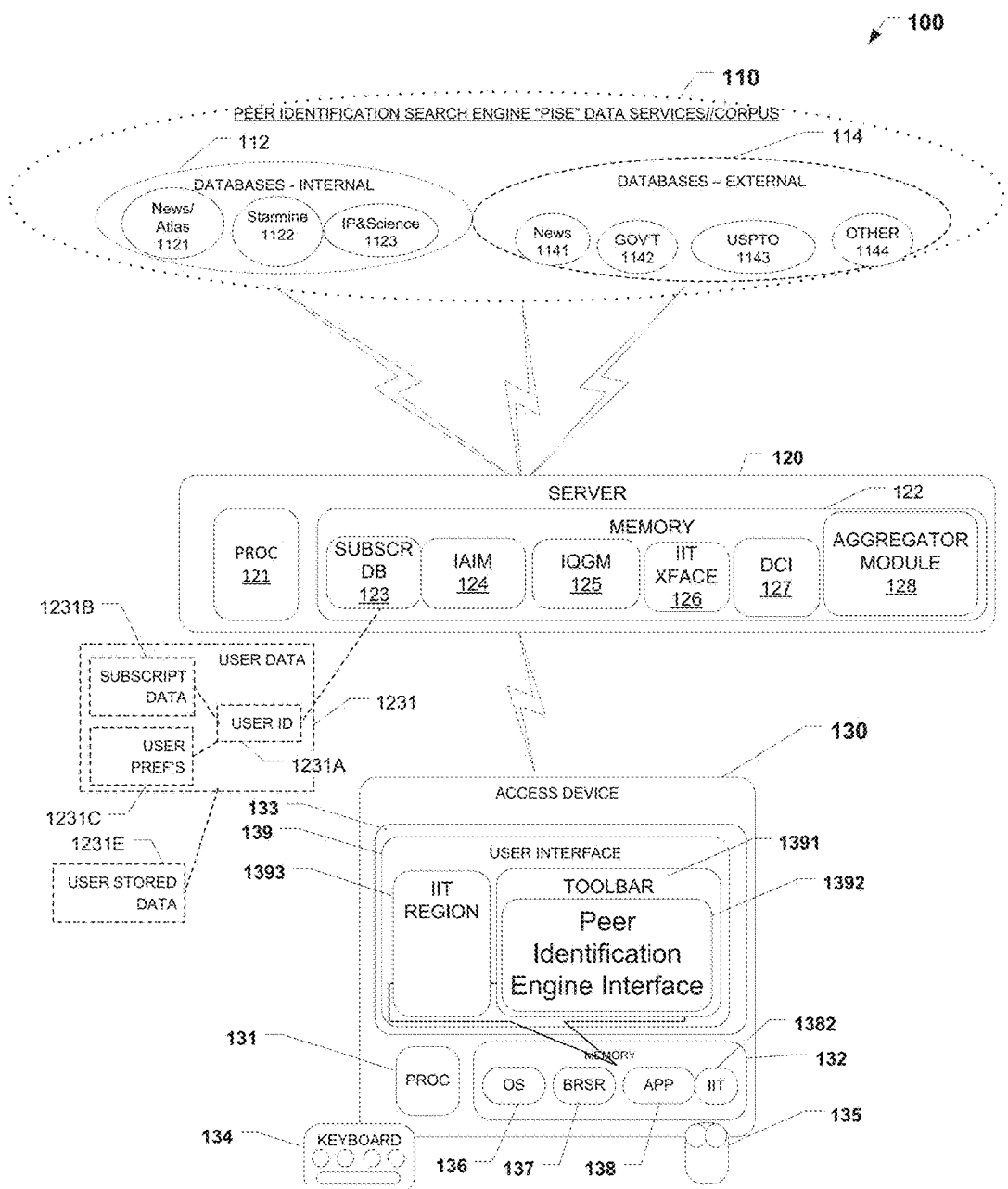
FIG. 1 is a schematic diagram illustrating an exemplary computer-based system for implementing the present invention Peer Identification Search Engine (PISE) system.
Figure 2:
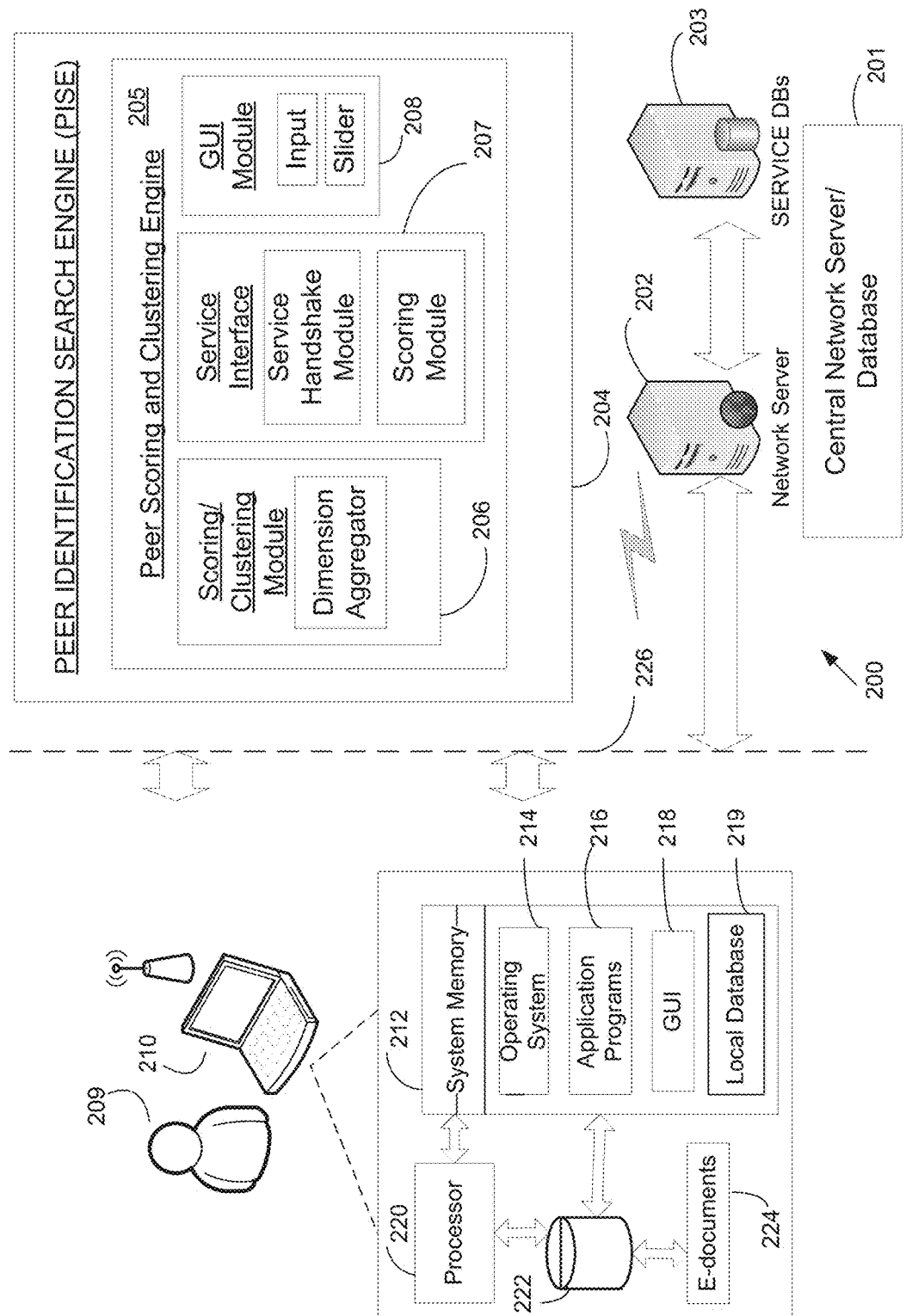
FIG. 2 is a schematic diagram illustrating an exemplary computer-based system for implementing the present invention PISE system.

FIGS. 1 and 2 illustrate exemplary embodiments of the overall architecture of the present invention. FIG. 1 is a schematic diagram of a client/server/database architecture associated with one implementation of the PISE of the present invention. With reference to FIG. 1, the present invention provides a Peer Identification Search Engine ("PISE") 100 that accesses information, collectively referred to at 110 as global supply chain information, news/media and other content database(s). PISE 100 is adapted to automatically collect and process internal and external sources of information (112, 114) relevant in collecting supply chain graph information to be used to generate supply chain graphs. Server 120 is in electrical communication with Peer Identification Search Engine databases 110, e.g., over one or more or a combination of Internet, Ethernet, fiber optic or other suitable communication means. Server 120 includes a processor 121 and a memory 122, in which is stored executable code and data, including a subscriber (e.g., EIKON) database 123, an Input and Identification Module ("IAIM") 124, Instantiated Query Generation Module ("IQGM") 125, a user-interface module 126, a training/learning module 127 and a classifier module 128. Processor 121 includes one or more local or distributed processors, controllers, or virtual machines. Memory 122, which takes the exemplary form of one or more electronic, magnetic, or optical data-storage devices, stores non-transitory machine readable and/or executable instruction sets for wholly or partly defining software and related user interfaces for execution of the processor 121 of the various data and modules 123-128.

Quantitative analysis, techniques or mathematics and models associated with modules 124 to 128 in conjunction with computer science are processed by processor 121 of server 120 thereby rendering server 120 into a special purpose computing machine use to transform peer lists, similarity scores, and other information into aggregated peer lists and similarity scoring and to deliver services for use by business analysts. This may include generating a set of search requests with entity identifiers for sending to services for generating lists of peers and similarity scores to be received and aggregated by the PISE system.

The PISE 100 of FIG. 1 includes an Input and Identification Module ("IAIM") 124 adapted to permit the receipt of a query including an entity or entities of interest. The IAIM 124 further comprises an entity identification module for identifying entities in queries and associating with them with entity identifiers for use with services. The PISE 100 also includes an Instantiated Query Generation Module ("IQGM") 125 communicatively coupled to the IAIM 124 for generating a query comprising entity information for use with services.

The PISE 100 includes digital communications interface ("DCI") 127 that facilitates processing of search queries for issuing search requests to services, including necessary entity identifiers, and receiving service responses, including peer lists and scoring data, and handling follow up search requests such as after receiving feedback from users via the user interface that may indicate positives or negatives related to the initial peer lists of the services. Necessary handshake processing is handled by the DCI.

In one exemplary implementation, the PISE 100 may be operated by a traditional financial services company, e.g., Thomson Reuters, wherein PISE database corpus or set 110 includes internal service or databases or sources of content 112, e.g., TR Atlas/News 1121, and Starmine 1122 and IP&S 1123 and other TR Feeds. In addition, PISE database set 110 may be supplemented with external sources 114, freely available or subscription-based, as additional data considered by the PISE. News database or source 1141 may be a source for confirmed facts. Also, government/regulatory filings database or source 1142, USPTO 1143, as well as other sources 1144, provide data to the PISE system for generating aggregated peer lists and similarity scoring. PISE may be used to enhance investment and trading strategies and enable users to track and spot new opportunities in a changing market.

The PISE 100 may be implemented in a variety of deployments and architectures. PISE data can be delivered as a deployed solution at a customer or client site, e.g., within the context of an enterprise structure, via a web-based hosting solution(s) or central server, or through a dedicated service. FIG. 1 shows one embodiment of the PISE as comprising an online client-server-based system adapted to integrate with either or both of a central service provider system or a client-operated processing system, e.g., one or more access or client devices 130. In this exemplary embodiment, PISE 100 includes at least one web server that can automatically control one or more aspects of an application on a client access device, which may run an application augmented with an add-on framework that integrates into a graphical user interface or browser control to facilitate interfacing with one or more web-based applications.

Subscriber database 123 includes subscriber-related data for controlling, administering, and managing pay-as-you-go or subscription-based access of databases 110 or the PISE service. In the exemplary embodiment, subscriber database 123 includes user data (or more generally user) as data structures 1231, including user identification data 1231A, user subscription data 1231B, and user preferences 1231C and may further include user stored data 1231E. In the exemplary embodiment, one or more aspects of the user data structure relate to user customization of various search and interface options. For example, user ID 1231A may include user login and screen name information associated with a user having a subscription to the services accessed and distributed via PISE 100.

Access device 130, such as a client device, may take the form of a personal computer, workstation, personal digital assistant, mobile telephone, or any other device capable of providing an effective user interface with a server or database. Specifically, access device 130 includes a processor module 131 including one or more processors (or processing circuits), a memory 132, a display 133, a keyboard 134, and a graphical pointer or selector 134. Processor module 131 includes one or more processors, processing circuits, or controllers. Memory 132 stores code (machine-readable or executable instructions) for an operating system 136, a browser 137, peer display/graph software 138, and interactive interface tools (IIT) 1382. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. Upon launching processing software an integrated information-retrieval graphical-user interface 139 is defined in memory 132 and rendered on display 133. Upon rendering, interface 139 presents data in association with one or more interactive control features such as user interface tools region 1393, toolbar 1391, and Peer Identification Engine interface 1392.

The interface 1392 may incorporate, comprise, or consist of a variety of existing software solutions or GUIs.

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to Internet-Protocol (IP) address for an online information-retrieval system, such as offerings from Thomson Reuters Financial, Thomson IP, Starmine, Westlaw, EIKON, and other systems, and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server, such as one operated by a financial services customer, may receive one or more of the framework, tools, APIs, and add-on software for loading onto one or more client devices 130 using internal processes.

Once installed in whatever fashion, a user may then be presented an online tools interface in context with a document-processing application. Add-on software for one or more applications may be simultaneously invoked. An add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

With reference to FIG. 2, the above processes, and as discussed in more detail below, may be carried out in conjunction with the combination of hardware and software and communications networking illustrated in the form of exemplary PISE system 200. In this example, PISE system 200 provides a framework for searching, retrieving, analyzing, and comparing service returned peer lists and scoring. Peer Identification Search Engine (PISE) 200 may be used in conjunction with a system offering of a professional services provider, e.g., Eikon, a part of Thomson Reuters Corporation, and in this example includes a Central Network Server/Database Facility 201 comprising a Network Server 202, a plurality of service databases 203, e.g., Thomson Reuters Financial, Thomson IP&S, Starmine, Westlaw, EIKON, USPTO database, and other publicly and privately available services. Search Engine 204 having as components a peer scoring/clustering engine 205, a scoring/clustering module 206, a service interface module 207 and a User Interface/Graphical Interface Module 208. The Central Facility 201 may be accessed by remote users 209, such as via a network 226, e.g., Internet. Aspects of the PISE system 200 may be enabled using any combination of Internet or (World Wide) WEB-based, desktop-based, or application WEB-enabled components. The remote user system 209 in this example includes a GUI interface operated via a computer 210, such as a PC computer or the like, that may comprise a typical combination of hardware and software including, as shown in respect to computer 210, system memory 212, operating system 214, application programs 216, graphical user interface (GUI) 218, processor 220, and storage 222 which may contain electronic information 224 such as electronic documents. The methods and systems of the present invention, described in detail hereafter, may be employed in providing remote users access to a searchable database. In one exemplary form of operation, a remote user interested in identifying peer companies having similar patent assets may search a patent document database using search queries based on patent numbers, IPC codes, and company name to retrieve and view patent documents of interest and to selectively query the PIE for peer companies related to the input query comprising a company name, and IPC code, or a patent number, for example. Because the volume of patent documents is quite high, the invention provides similarity scoring processes that facilitate an efficient and highly effective, and much improved, searching operation. Client side application software may be stored on machine-readable medium and comprising instructions executed, for example, by the processor 220 of computer 210, and presentation of web-based interface screens facilitate the interaction between user system 209 and central system 201. The operating system 214 should be suitable for use with the system 201 and browser functionality described herein, for example, Microsoft Windows operating systems commonly available and widely distributed. The system may require the remote user or client machines to be compatible with minimum threshold levels of processing capabilities, minimal memory levels and other parameters.

The configuration thus described in this example is one of many and is not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

Figure 3:
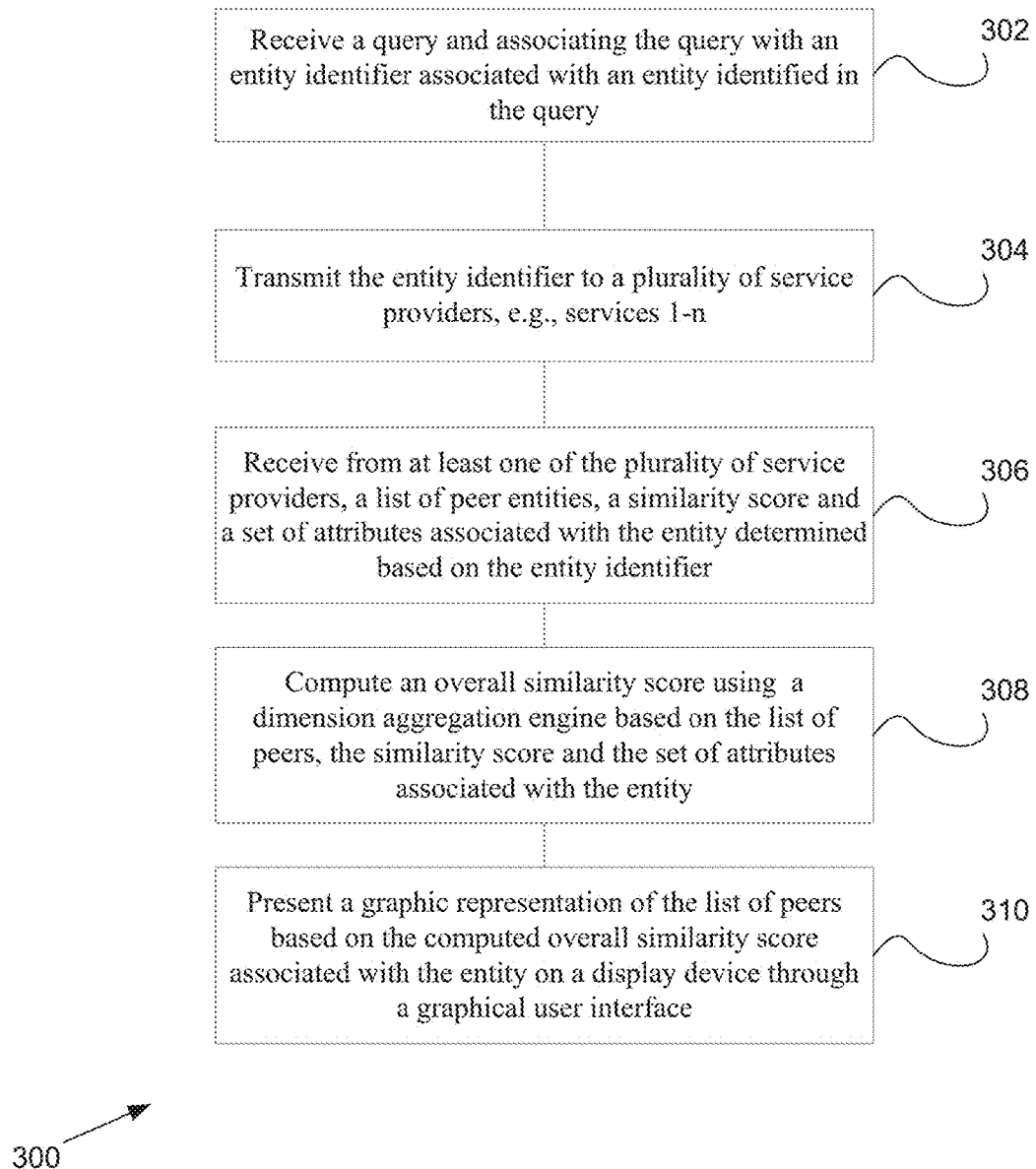
FIG. 3 is a flowchart illustrating an exemplary method implemented on a computer-based system for the present invention PISE system.

FIG. 3 illustrates a logical flow of operation 300 of the PISE search engine. In particular, at step 302 the DCI input of PISE system receives, such as from a user remote device connected to the PISE system via a communications network, a query comprising an entity identifier, the entity identifier associated with an entity. The entity may be a company name, a person's name, a product identifier, a commodity, for example. At step 304, the PISE system transmits the entity identifier to a plurality of service providers, e.g., services 1-$n$ of FIG. 6. At step 306, the Dimensions Aggregator through service integration determines by at least one of the plurality of service providers, a list of peer entities, a similarity score and a set of attributes associated with the query entity using the entity identifier. At step 308, the PISE system computes an overall similarity score using the dimension aggregation engine based on the list of peers, the similarity score and the set of attributes associated with the entity. At step 310, a graphics user interface component of the PISE system generates and presents, e.g., for display at the remote user device via the communications network, a graphic representation of the list of peers based on the computed overall similarity score associated with the entity on a display device through a graphical user interface.

Figure 4:
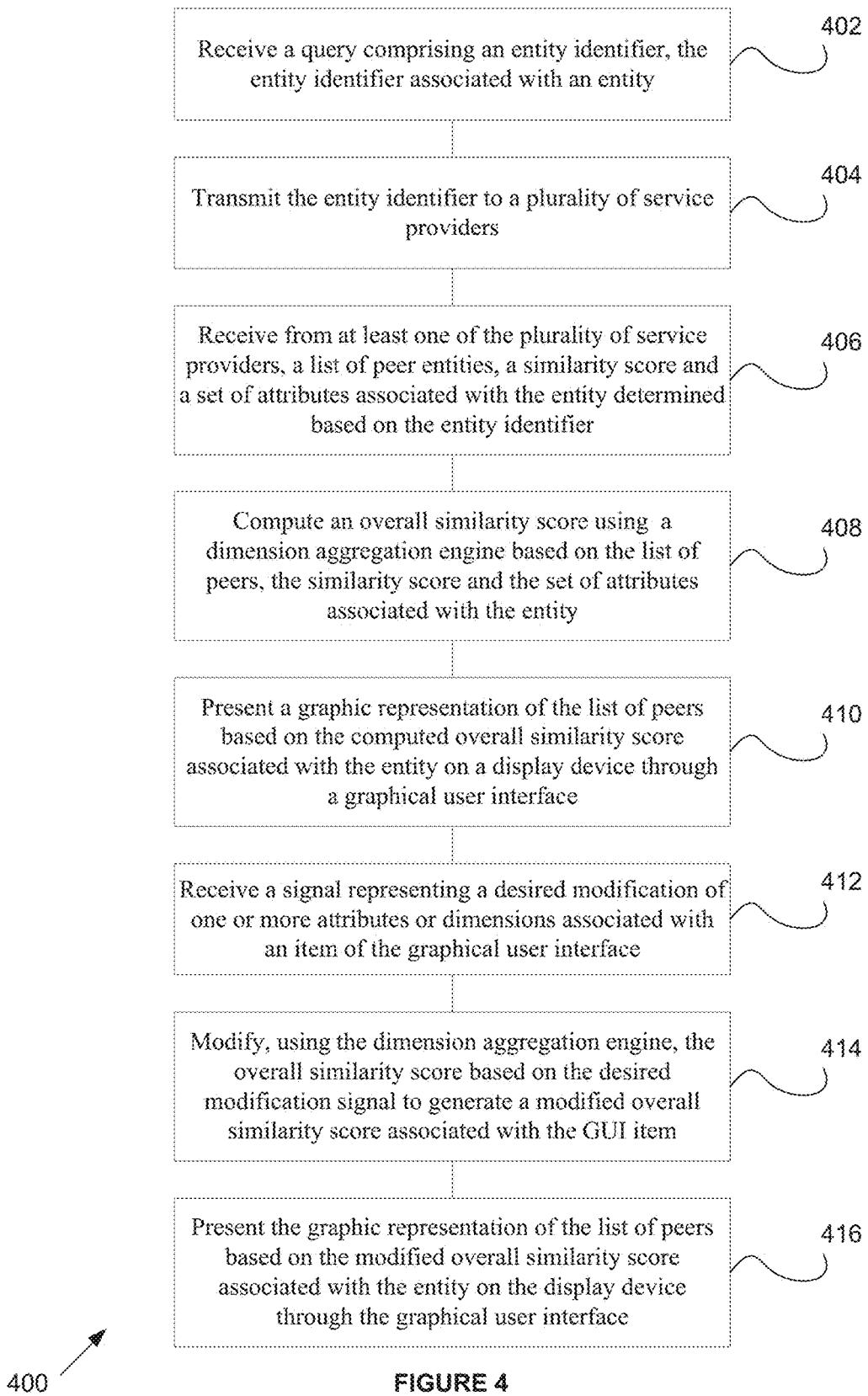
FIG. 4 is a further flowchart illustrating an exemplary method implemented on a computer-based system for the present invention PISE system having user control elements.

FIG. 4 illustrates a further logical flow of operation 400 of the PISE search engine including user input following peer similarity scoring to further process peer results. At step 402, the input of PISE system receives a query from a remote user seeking a list of peers related to an input entity. An entity identifier is associated with the input query entity and at step 404 the PISE system transmits the entity identifier to a plurality of service providers, such as services 1-$n$ of FIG. 6. At step 406, at least one of the plurality of service providers determines a list of peers, a similarity score and a set of attributes associated with the entity using the entity identifier. The dimensions aggregator of the PISE system receives the entity peer listing from each service and aggregates the results. At step 408, the PISE system computes an overall similarity score using the dimension aggregation engine based on the received lists of peers, the similarity scores and the sets of attributes associated with the entity. At step 410, a graphical user interface component of the PISE system generates and presents, such as via a remote user device, a graphic representation of the aggregated list of peers based on the computed overall similarity score associated with the entity on a display device through a graphical user interface. At step 412, the PISE system receives via manipulation of a user interface element presented in conjunction with the user interface a signal representing a desired modification of one or more attributes or dimensions. For example, a user manipulation may be by moving a slider interface element associated with an item of the graphical user interface such as sliders 810 of FIG. 8 and sliders 910 of FIG. 9. At step 414, the PISE system modifies, using the dimension aggregation engine, the overall similarity score based on the desired modification signal received from the user remote device and generates a modified overall similarity score. This may result in a revised list of peers removing some originally included and adding some originally not included and/or re-ranking the list of peers based on the modified overall similarity scores. At step 416, the PISE system presents the graphic representation of the list of peers based on the modified overall similarity score associated with the entity on the display device through the graphical user interface.

The PISE engine receives a query concerning one or more entity(ies) of interest, sends requests to services, receives dimension services information having peer lists and similarity scores, and aggregates and provides a list of peer entities ranked by similarity to the query entity(ies) of interest. Although the PISE system is discussed herein in connection with companies as the entities being searched and produced as peers, the invention is not limited to such entity types. Additional exemplary use cases would adapt the PISE engine to aggregate persons, academic institutions, products, stocks, funds, and books. As the user interface aggregation and clustering engines are domain independent the PISE engine may adapted to provide similar services for other domains.

Comparing entities for similarity has been a longstanding need for many interested parties and concerns—including service providers. One area of recognized need is in the financial domain where a list of similar companies or stocks or funds is needed for presenting to customers such as stock advisors, investors, investment bankers, private equity concerns, and other interested persons. Existing engines merely provide a static implementation of creating a list of similar entities. For example, the Starmine engine creates a list of similar companies by grouping companies covered by the same industry analysts; the Atlas engine creates a list of similar private companies by comparing the co-occurrence graph of entities; and Reviewer finder can identify reviewers of scientific papers with similar profile to the authors based on publication history. Individually these services provide a relatively narrow set of attributes or dimensions from which they derive similarity and other signals.

The PISE system provides an enhanced user experience and results by aggregating a plurality of services that collectively span a much greater set of dimensions to even or round out the scoring. With the PISE system, the particular scoring algorithm used by each service in arriving at its respective peer list/score is not considered but rather simply the dimensions/attributes included in the determination. The PISE system separates peer similarity based on distinct dimensions (which may include facets or attributes) and aggregates service signals/scoring/lists into a single score and presents the dimensions via a user interface as layers. Currently available services that are available for use in the PISE include TR products such as the Starmine engine, the Atlas engine, TR IP services including patent and trademark related search engines, Westlaw, which relates to legal related information. Another example of an internal service delivering peer similarity data into the dimensions aggregator is Thomson Reuters Tax and Accounting services, e.g., transfer pricing product gives users a list of comparable companies. Each service mentioned above each may contribute to one or more dimensions used in the dimensions aggregator of the PISE engine presented here.

The PISE system allows independent development of service engines contributing a facet to be aggregated. The distributed nature of the service engines used by the PISE system makes the system highly extensible and flexible. These two attributes also help increase the quality of the system; as over time the accuracy of the services can be increased contributing to the overall quality of the ranking list.

The PISE system provides a flexible aggregation component by allowing end users to pass a set or batch of multiple entities to the system. The system uses the dimension services to receive scores for the different attributes and then uses these scores to cluster the results into groups. The collective attributes of all member entities of each group are then be used to generate additional peers to the group. Through use of user interface elements users of the system have the ability to influence the weights of the dimensions to experiment which clusters (creates groups) and further refine the data for a given use case.

The PISE system through the dimensions aggregator/digital communications interface with services can in effect provide such services with feedback as to how users view the received data. This feedback allows services the opportunity to learn by example. Either a single or multiple companies are passed to the system. The system will adjust the weights of the dimensions to return the overall list where the query items (items passed to the system) are a subset of the items returned. When the service re-runs the requested search based on the user's change to the parameters this may be received as a qualitative feedback and the service may capture this information to then refine its processes based on patterns over time.

Providing a generic engine allowing the aggregation of multiple dimensions into a final score makes it possible to provide the invention as a TR platform service. Multiple business units/product groups can define and implement services independently and also reuse services provided by someone else (i.e., the domain experts). It lets the different products focus on the specific Use case and not on the engine.

The flexibility of the PISE engine in allowing users to cluster, aggregate and visualize multiple dimensions (attributes) comparing an item into a single ranked similarity list is a powerful service offering greatly enhancing the user experience associated with current service engines that are narrower from both dimensional and algorithmic/methodology standpoints.

The ability to allow the user to adjust weights of the dimension scores to allow a user to individually decide what aspects of an item are important. The PISE provides an engine that can be used by different product groups to create use case specific lists of similar items. The advantage of the invention is the flexibility of integrating multiple dimensions into clusters and a final ranked list as well by allowing integration of dimension services written independently by experts of a dimension as discussed in detail hereinabove and below.

One exemplary PISE implementation involves multiple layers (Clustering, Dimension Aggregation and GU)). Showing multiple possible views of ranked lists based on the use cases. A variety of dimension services are available showing the potential of the invention in various domains. Two exemplary use cases (comparable companies and comparing academic institutions) are discussed herein in detail but the invention is not limited to the use cases described in detail herein.

The engine and user interface could be extended to show different visualization of the clusters and using for example proximity graphs instead of ranked list. The PISE engine may be used to create custom peer lists that will support a business development workflow, using both the peers for a single company as well as peers for a group of companies. The PISE service may be implemented as part of the existing TR Eikon service. Monitor Suite and ContactNet are additional existing services in which the PISE engine may be integrated. The method may also support a transfer pricing/tax peer detection workflows and offerings by TR Tax and Accounting businesses. PISE engine may be implemented as a platform service usable by multiple business units in the case of a company, such as TR, having a broad range of service offerings. For example, PISE may be used in TR's Financial & Risk or Markets business, e.g., Eikon service, and in TR's Intellectual Property & Science business, e.g., in SSR/InCites service. Likewise, such business may incorporate existing services into the PISE system, thereby providing a platform service where internal services can contribute dimension services into PISE. In addition, external public and private services may be used as dimensions within the PISE system.

Incorporated by reference herein in the entirety are the following disclosures of technology and systems with which the PISE engine may be integrated: U.S. patent application Ser. No. 11/799,768—Method And System For Disambiguating Informational Objects issued as U.S. Pat. No. 7,953,724; U.S. patent application Ser. No. 10/171,170—Systems, Methods, And Software For Hyperlinking Names issued as U.S. Pat. No. 7,333,966; U.S. patent application Ser. No. 11/028,464—Systems, Methods, Interfaces And Software For Automated Collection And Integration Of Entity Data Into Online Databases And Professional Directories, issued as U.S. Pat. No. 7,571,174; U.S. patent application Ser. No. 12/341,913—Systems, Methods, And Software For Entity Relationship Resolution; U.S. patent application Ser. No. 12/341,926—Systems, Methods, And Software For Entity Extraction And Resolution Coupled With Event And Relationship Extraction; U.S. patent application Ser. No. 12/658,165—Method And System For Ranking Intellectual Property Documents Using Claim Analysis issued as U.S. Pat. No. 9,110,971; U.S. patent application Ser. No. 14/789,857—Method And System For Relationship Management And Intelligent Agent; U.S. patent application Ser. No. 13/594,864—Methods And Systems For Managing Supply Chain Processes And Intelligence; U.S. patent application Ser. No. 13/914,393—Methods And Systems For Business Development And Licensing And Competitive Intelligence; and U.S. patent application Ser. No. 14/726,561—Method And System For Peer Detection.

FIG. 5 illustrates an exemplary use case of inputting a single company, Boehringer Ingleheim, to obtain a set of similar "peer" companies. Fundamental workflow in this use case is for any given company, identify its most similar peer companies. The PISE provides the following benefits previously unavailable: increase the scope of companies; improve the quality of peer recommendations; provide multiple flavors of peer lists; allow end user control and customization; and provide transparency and explanations for the recommendations.

In this exemplary use case there are four dimensions—Financial & Risk, Legal, Tax & Accounting, and IP & Science. Financial & Risk includes the following service attributes: news, broker research, bonds, fundamentals, and press releases. Legal includes the following service attributes: case law, administrative decisions, public records, dockets, and arbitration. The Tax & Accounting dimension service provides editorial analysis attribute. The IP & Science dimension service provides the following attributes: scholarly articles, patents, trademarks, domain names, clinical trials and drugs. Associated with these dimension services are: entity, fact and event extraction; concordance and resolution services; organization and people masters; and centralized content access.

Exemplary Personas and Use cases for use with the PISE engine include: Use case 1: Investment Banker/Corporate Development—Show me peer companies that can be used for valuation activities and/or can be potential targets or acquirers; Use case 2: Investment Manager Show me peer companies that user should be benchmarking this company's performance against; Use Case 3: Transfer Pricing Professional—Show me peer companies that have the most similar business lines; Use Case 4: Supply Chain—Show me peer companies that can be additions/alternatives to my current suppliers.

The PISE system algorithmically identifies comparable entities (e.g., use case "find me the peers of IBM") using service data available from sources associated with the PISE system, e.g., Thomson Reuters family of companies and related services, and sources unassociated or unaffiliated with the PISE system. For example, the services may include the following existing services StarMine Monitor's (Starmine) peer ranking tool (based on sell-side equity analyst coverage), Thomson Reuters DataScope, Thomson Reuters Intellectual Property & Science services (IP&S) (including MarkMonitor, SAEGIS, Thomson Innovation, WestlawIP, SERION, Techstreet, Pharma & Life Sciences, BioWorld, Cortellis, MetaCore, Newport, Integrity, InCites, Web of Science, and Thomson Reuters Business Classification (TRBC) industry classification service.

For example, TRBC classifies primary business activity of over 72,000 listed companies from 130 countries into a five level hierarchy (economic sectors, business sectors, industry groups, industries, and activities—with each level being essentially a granular drill down of the next higher level) using company filings, Reuters news and Thomson Reuters corporate actions services to assign and maintain company activity. TRBC helps users identify, monitor and analyze companies and industries across global markets and is the ideal tool for benchmarking, peer comparison and navigation. TRBC is the basis for Thomson Reuters sector indices, and is also available for investors and managers looking to build custom sector and thematic indices. The PISE system essentially ignores the methodology used by TRBC but does consider and link based on the dimensions/attributes used by the service.

Generally, services may include services that deliver peer scoring and list data based on any of the following: similar financials, similar patent classes, and similar trademark classes. Moreover, services exist that receive query terms and generate ranked results and may potentially provide a service input capable of being integrated into the dimensions aggregator of the PISE system to deliver data related to: similarity of keywords in the search entity business description, similarity of keywords mentioned on the search entity's website. One further alternative source of service data is the searching user providing their own data as a source for inclusion in the PISE similarity scoring algorithm.

The PISE system receives peer identification and scoring information from services and may be implemented as part of platforms for delivery of services to particular sets of users. One example of a platform for operating the PISE system is Thomson Reuters Eikon, which is a platform for financial professionals involved in trading and investment activities and is a combination of information, analytics and exclusive news on financial. Thomson Reuters Eikon covers all major financial markets—equity, fixed income, commodities, foreign exchange—and provides effective compliance and risk management, investment management and wealth management solutions. The content and analytics package includes pricing data, financial research, global financial news and commentary, financial estimates, fundamentals analysis, and visual analysis through charting. The services that are used with the Eikon platform may also be used as the source of peer identification data integrated into overall peer identification by the PISE system.

Preferably, the PISE system is implemented to provide users mechanisms to control the ranking algorithm. Such a user interface control element may be for example a virtual slider mechanism to change the weightings of the component scores. Alternatively, the user interface element may involve re-running the algorithm entirely. The PISE system also may provide an ability to submit batches of entities rather than just one, with the dimension aggregator identifying the commonalties automatically before recommending comparable or peer entities.

In addition to the common use case "find companies like company X," the PISE system may be adapted to process the following use cases: Find drugs like this; Find legal cases like this; Find advisers like this; Find logos like this; Find political candidates like this; Find manufacturing sites like this; Find oilfields like this; Find sports players like this; and Find sponsors like this. Instances of possible use cases having a temporal component are: Find trading patterns like this; and Find weather patterns like this. The PISE system also supports more complex use cases "Find companies like Company X, but not Company Y but include Company Z." This latter variation may occur at the beginning of a search or after a set of peer results has been returned and the user wishes to select and/or deselect companies initially returned as peers to further refine the results.

Figure 6:
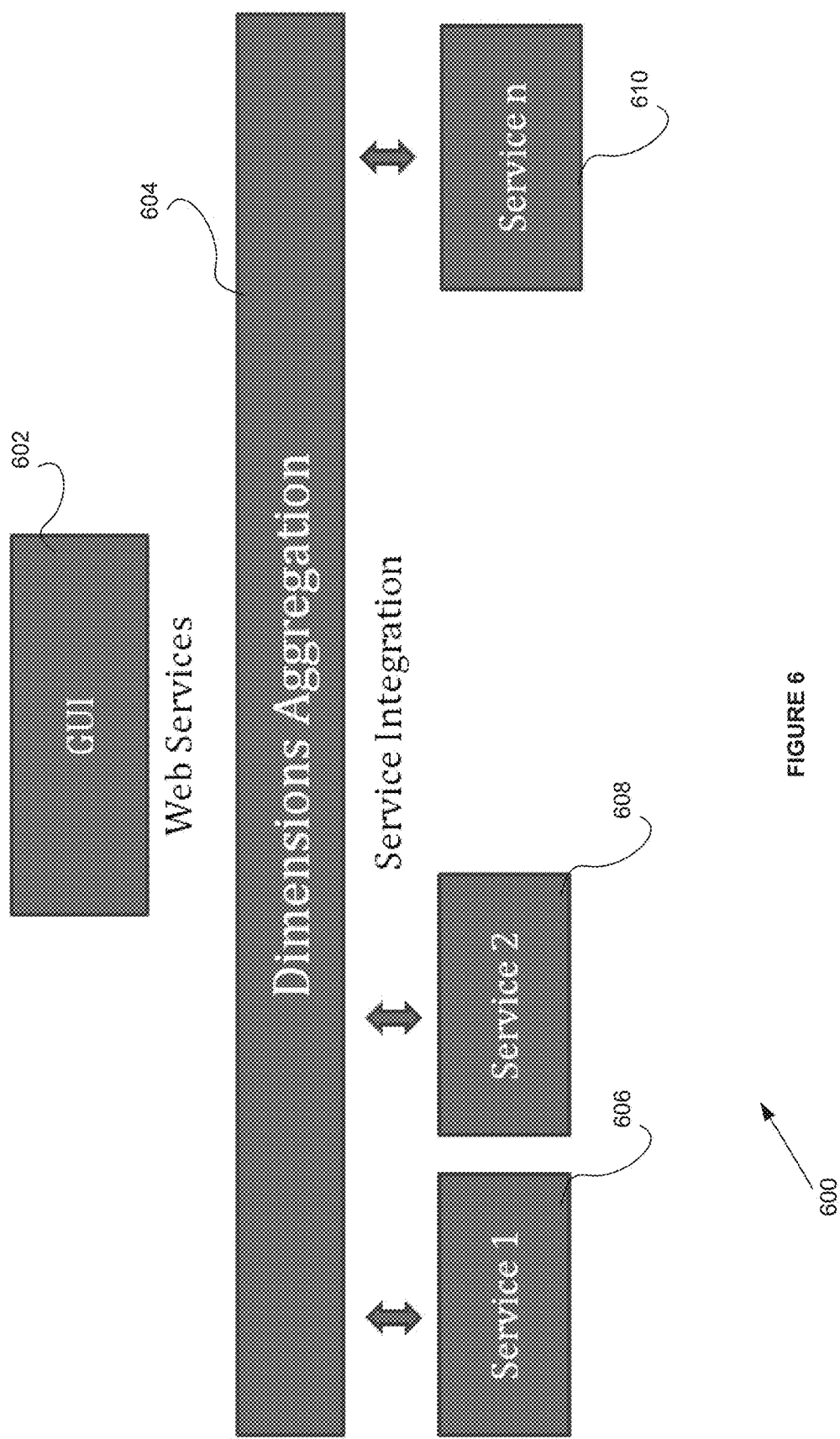
FIG. 6 is an exemplary architecture in accordance with the present invention PISE system.

FIG. 6 illustrates an exemplary architecture 600 of the PISE system having Graphical User Interface 602 which provides user interface for receiving search input (either individual entities or a list of entities) and elements allowing users to further manage results. Graphical User Interface 602 may comprise multiple GUIs such as by using aggregation layer web services and may include one or more GUIs associated with one or more of the services 1-N. Using the GUI, for example, the user may select or de-select from a list of returned similar peer entities, such as by check box elements, to further refine the search process. The interface provides elements, such as sliders, allowing a user to alter the weighting or effect of specific services or attributes represented within one or more services. Such slider and other elements are shown in more detail in the exemplary user interface of FIG. 9 discussed in detail below. Additional elements may be provided to allow users to drill down within services and/or attributes. For example, the attribute "geography" may be included. Services may include more granular information related to attributes. In this example, a user may drill down into geography to focus the results of peer entities based on region, country, state/province, city, etc.

As shown, PISE architecture 600 includes a Dimensions Aggregator 604 which receives data and information from Services 1-N, 606-610. Services 1-N as used herein represent services that provide data and information about entities, e.g., Starmine, TR Atlas, IP&Science, Fundamentals, etc. Each service may employ a proprietary algorithm or process for arriving at a list of similar entities. In this manner, by using a variety of services the PISE system is not biased due to the influence of any particular algorithm or model used in determining similar entities. For example, if service #1 includes attributes A-D but not E-G, then to round out the peer identification process the PISE system may include one or more services #2-#N that include one or more of attributes E-G. In this manner the PISE removes biases otherwise associated with service #1.

Figure 7:
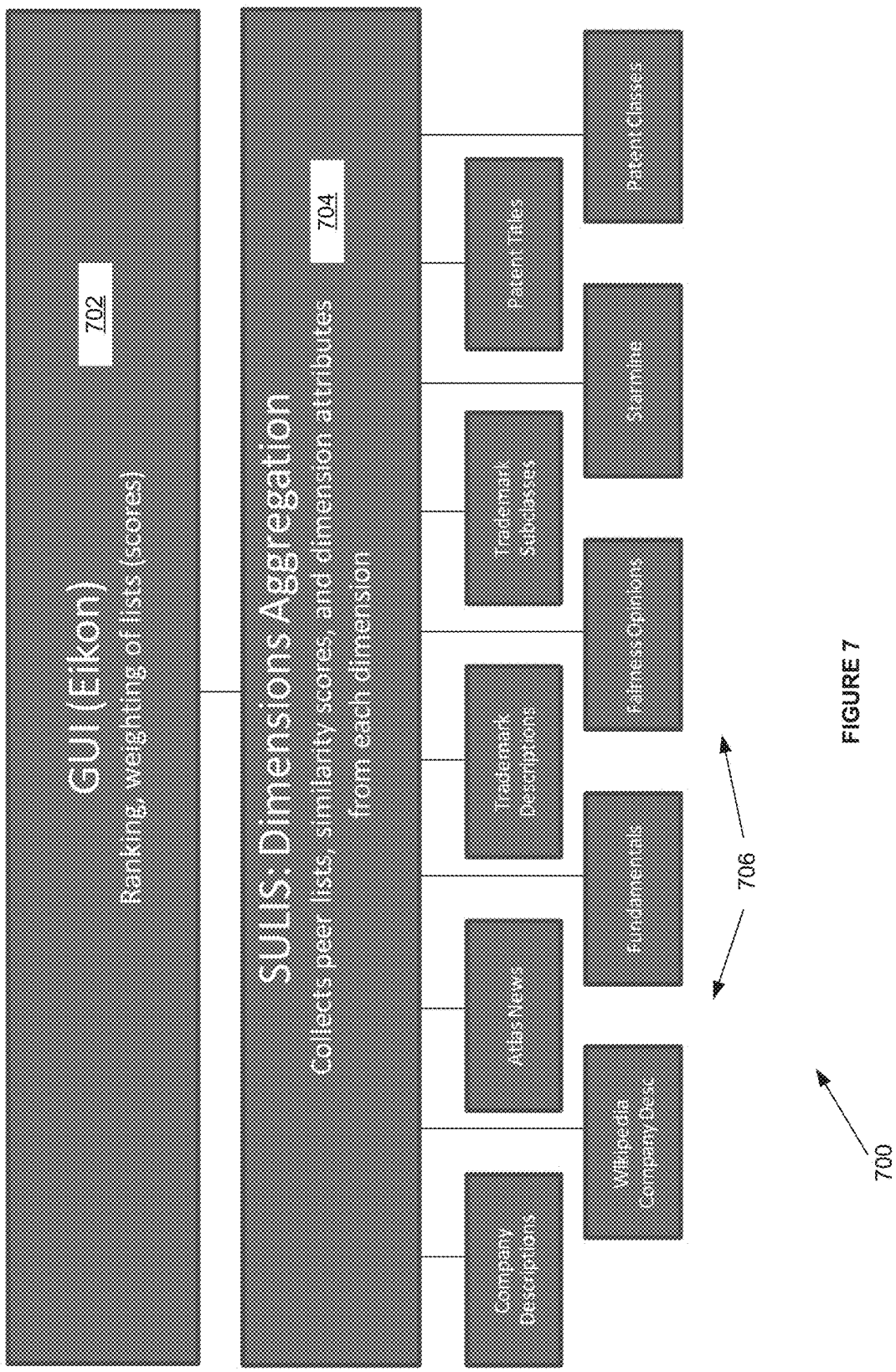
FIG. 7 is a further exemplary architecture in accordance with the present invention PISE system.

With reference now to FIG. 7, a further exemplary PISE architecture 700 is illustrated in which GUI 702 is implemented through TR Eikon platform and is presented in connection with a ranking and weighting of lists based on scores. In this example, Dimensions Aggregator 704 collects peer lists, similarity scores, and dimension attributes from each dimension. Services 706 include the following services (by name or content): company descriptions, Atlas News, ContactNet, Trademark descriptions, trademark subclasses, patent titles, Wikipedia company description, Fundamentals, Fairness Opinions, Starmine, and Patent classes. The PISE architecture is preferably extensible.

One example of a service that may be accessed by the PISE system is Patents, e.g., Derwent Patent Database containing approximately 50 million patent records. The service associates patents with entities, e.g., companies/assignees, inventors, patent attorneys or firms, PTO examiners. In the use case of searching of peer companies based on associated patents, the user may select (of the PISE may have a default set) a set of attributes that defines a company patent portfolio. Based on the selected attributes, the PISE system establishes a similarity measure, such as by scoring. Based on the similarity measure companies that have similar scores or other measured qualities, are considered peer candidates. The PISE system may then cluster the peer candidates for presenting to the user in list form or other graphical representation.

In operation, each service returns to PISE a list of similar peer entities in accordance with its technical contract. Typically, services will return for a list of peers—similarity scores, names, identifiers—and for a list of attributes/dimensions—name, value, score, weight. Dimensions Aggregator 604 aggregates the lists returned to it from Services 1-N 606-610. The Dimensions Aggregator then produces a list of peers with aggregated/composite score information for presenting to the user. Preferably, the peer list includes along with the composite score the component scores related to each attribute included in the set of attributes considered by the PISE system. In one manner the PISE system may have a default set of attributes or parameters and alternatively the PISE system may allow users to select or de-select attributes considered in the peer identification process. The PISE system may also allow users to select or de-select services to include in the scoring process. In addition, the system may allow for presentation of available services based on known subscriptions to private services and/or public services. In operation, the PISE system may include in whole or in part an integrated sign-in/login process (e.g., TR OnePass) or the user may be required to sign in to each service independently. During user setup process the user may be allowed to set up automated login for available services.

With respect to service integration, two exemplary implementation stacks that are supported are Java and Restful JSON; two standard APIs are Single Organization and Organization list; and common responses from all services would be List of Peers (similarity score, name, OID), List of Attributes (name, value, score, and weight). Typically, each service has a technical contract that the service adheres to in the context of what types of information are considered in rendering the data and information delivered to the PISE system. Such a technical contract, or "web services" technical contract, provides a type of handshake with the PISE system including the attributes considered by the service. In association with such a technical contract, the service may include an Application Programming Interface "API" as required for integration with the PISE system. The information may include how information or a feed is to be received by the PISE system and how such information or feed is delineated. This technical contract in essence tells the PISE system what attributes are being used to arrive at that service's list or ranking of peer entities. In this manner the PISE system can associate or link or map a set of attributes with each particular service. For example, take the following Request:

```
{
  "id" : "4295877311"
}
```

In the request, the "id" is the known identifier of the entity. In one manner of implementation, all services work from the same base entity corpus where "id x" (here x entity identifier is "4295877311") from one service always equals "id x" from another service. This is particularly the case where services that expose dimensions to the Dimensions Aggregation Module are affiliated sources. The Response to the Request:

```
Response:
{
    "dimensionName":"Provide peers based on the fundamentals of
the target entity",
    "peers":[
        {
            "id":"93871",
            "name":"TRGR",
            "score":1.0 ,
            "weight":1.0,
            "attrs":[
                {
                    "description":"R&D Spend",
                    "value":"50000000",
                    "score":1.0 ,
                    "weight":1.0
                } ,
                {
                    "description":"Some other attribute",
                    "value":"another value",
                    "score":0.9 ,
                    "weight":1.0
                }
            ]
        }
    ]
}
```

The response returns a descriptive value telling the PISE engine the basis of the dimension. Along with that, services return an array of peers (in this example, there is only one, but it could be an array of 0 to N). The peer contains a name, score and weight applied. For every peer, there is a set of attributes: these attributes are items that make up the score for the peer. Again, the attributes could be 0 to N in array size. The PISE system does not require attributes in which case it would apply weighting on the peer result itself. But if attributes are provided, the PISE system may assign different weights to attributes—some higher than others.

For the use case where a plurality of entities are provided for processing, the response is the same, but the request looks like:

```
{
"id" : ["4295877311","88888888888"]
}
```

For the use case where values are returned to the service for reprocessing, the response is the same, but the request looks like:

```
{
"id" : "4295877311",
"positives" : ["4295877312", "4295877313"],
"negatives" : ["4295877314", "4295877315"]
}
```

In this manner the underlying service can learn from the user feedback in the form of the user selecting (positives) or deselecting (negatives) ones of the originally returned set of peer entities and returning this information to the service. In the above example the user returned a negative indication related to the peer entities associated with entity identifiers 4295877314 and 4295877315 and returned positive indications for peer entities associated with entity identifiers 4295877312 and 4295877313. In a further alternative embodiment the use of positives and/or negatives could be used at the very beginning when initiating a query—for instance a use case/query constructed as "find me companies like Exxon including British Petroleum but not including Gazprom or Duke Energy." Such an input may be tagged with an entity identifier for one or more of Exxon, British Petroleum, Gazprom and Duke Energy. For example, Thomson Reuters provides users with an organization/entity database including tagging function via its Open PermID service (https://permid.org/). Users may search by name or ticker symbol using the entity search engine and can use the TR Open Calais feature to tag unstructured content with Open PermID. An entity search API and the Open Calais Tagging API are provided at the TR Open PermID service.

While use of known entity identifiers sourced from a common entity database is a preferred manner of operation the invention is not limited to affiliated (or even unaffiliated) services operating off of the same base entity corpus. The PISE system may have entity identifier information or format for services based on a different entity corpus or nomenclature. In other examples the entity identifier may be a bar code for a product, a RIC code, Social Security Number, etc. In one manner of operation a user inputting a query through a GUI having an integral entity identifier function may result in a "PermID" entity identifier, e.g., from an entity master list or authority database or lookup table, or the like being tagged or appended to the query. However the invention does not require the query itself to contain an entity identifier and the PISE system may employ an entity identification module (such as a set of code in combination with a lookup table/service) to identify within the query an entity and associate an entity identifier with the identified entity. The service request signals sent from the dimension aggregation module may have a different entity identifier depending on the service the request is sent to. For example, for TR services Starmine or Fundamental or Derwent perhaps the same PermID is used to request a dimension service signal for the entity being searched, e.g., through an Eikon GUI. While this is optimal especially within a family of services, it may not work for other services. If a service is used that does not recognize the PermID or common entity identifier, then the system preferably knows the service-dependent search request format for receiving entity identifiers. The format of the input query may also vary depending on the user interface operating at the remote user device generating the input query. For example, a GUI operating in the Eikon or other TR-based platform may have an entity identifier tagged or associated with a PermID appended to the query. Where the digital communications interface of the PISE system is in communications with a non-TR user interface and receives a general query with a simple text string, the module may be configured to recognize the entity as a unique entity. The module then associates the entity identified from the input with one or more entity identifiers based on the service receiving the request from the dimension aggregator.

Based on the services mapping, the PISE system can aggregate the services into an aggregated representation of attributes considered in arriving at peer identification and at peer scoring/ranking In this manner, the PISE system can also present elements such as sliders that are linked to attributes, and therefore indirectly services, to enable users to selectively adjust points of emphasis that the system uses in generating peer list results. For example, by de-emphasizing an attribute linked with a service the PISE system reduces the impact of that linked service in arriving at composite similarity peer score. In addition, the PISE system includes an entity clustering feature for identifying and presenting groupings of entities. Although the present invention is largely described in terms of corporate entities, the invention is not limited to such entities and includes individuals, real or fictional, products, places, academic institutions, positions (e.g., governmental or corporate positions of leadership), organizations or teams or groups, funds, stocks, authors, patents, among other subjects. For example, the PISE system may be used by a user looking to identify potential high level officers of a company, e.g. identify a list of peer CEOs, CFOs, etc., based on appeal of a CEO of a closely related peer entity. In this example the user may use the PISE to identify a list of peer entities to identify a set of CEOs of those peer entities to then perform a search for individuals similar to or peers of those known CEOs.

Atlas/News is one exemplary service that delivers a list of comparable companies when provided with a search entity—data sources include Atlas Graph (News). Another service is Trademark Descriptions, which delivers nearest neighbor entities based on trademark goods and services descriptions—data sources include USAF Trademark database. Another service is Patent Titles, which delivers similarity based on nearest neighbor entities using patent titles—data sources include Derwent. Another service is Wikipedia, which delivers similarity based on nearest neighbors using Wikipedia company descriptions.—data sources include Wikipedia Company Pages.

Another service is Reuters Fundamentals Data (Company Financials), a Thomson Reuters (TR) Financial & Risk Management Solution as delivered through TR Eikon. Fundamentals service delivers key data points from company fundamentals to drive similarity score—data sources include DataCloud. Fundamentals as a dimension uses multiple attributes or sub-dimensions (e.g., corporate revenues, number of employees) and may, as a service, expose not only the similarity score set and list of peers but also the set of attributes/sub-dimensions. The PISE system may include in the graphical user interface the ability to re-run the overall scoring and peer list based on altering the weighting associated with either the Fundamentals Dimension or the discrete sub-dimensions exposed by the Fundamentals service.

Another service is Fairness Opinions or Deals Fairness Opinion Database, which delivers list of comparable companies provided by financial professionals to assess fairness of an M&A transaction—data sources include Deals fairness opinion database. Another service is Patent Class, which delivers similarity list based on IPC categories (technical breakdown) of patents filed by a company—data sources include Derwent. Additional services are Starmine, which delivers a list of company peers based on analyst coverage—data sources include Starmine peers through DataCloud, and TRBC industry classification. Another service is Trademark Subclasses, which delivers fine grain sub-classing based on topic detection using the goods and services descriptions and in which topics are lined up to measure similarities of topic distribution—data sources include USAF Trademark database. Another service is Descriptions, which delivers a similarity measure from short company descriptions found in press releases.

As an example, TRBC classifies industries and companies at multiple levels, including from highest to lowest at business sector level=>industry group level=>industry level. For example, business sector 5010 Energy-Fossil Fuels/=>Industry Group 501010 Coal (=>Industry 50101010 Coal)/Industry Group 501020 Oil & Gas (=>Industry-50102010 Integrated Oil & Gas; 50102020 Oil & Gas Exploration and Production; 50102030 Oil & Gas Refining and Marketing)/Industry Group 501030 Oil & Gas Related Equipment and Services (=>Industry-50103010 Oil & Gas Drilling; 50103020 Oil-related Services and Equipment; 50103030 Oil & Gas Transportation Services). Business sector 5020 Renewable Energy/=>Industry Group 502010 Renewable Energy (=>Industry-50201010 Renewable Energy Equipment & Services; 50201020 Renewable Fuels). Business sector 5030 Uranium/=>Industry Group 503010 Uranium (=>Industry-50301010 Uranium). Based on this classification, TRBC may deliver as a dimension a list of peers based on an input entity that closely corresponds to entities within a common business sector/industry group/industry.

As a further example, the Patent Dimension may include or be based solely on the Derwent service, which is a classification system for patents that attempts to resolve ambiguity arising when companies use different names for similar inventions and/or due to variation when patent documents are translated into different languages. Also, keywords can appear in many different contexts within patent titles, e.g., "valve" can be either mechanical or electrical. Derwent provides a subject classification system for effective patent searching and from which a set of peers may be determined for a given company. More particularly, Derwent World Patents Index ("DWPI") categorizes patent documents across major areas of technologies using a unique classification system. Patents are divided into three broad areas: Chemical, Engineering, and Electronic and Electrical Engineering, which are further divided into Sections and Classes based on technical area, or areas, covered by the patent. DWPI divides patents into 21 broad subject areas or Sections designated A-M (Chemical); P-Q (Engineering); and S-X (Electronic and Electrical). Sections are then further subdivided into classes consisting of the Section letter followed by two digits, e.g., X22 is the Class designation for Automotive Electrics and C04 is the Class for all Chemical Fertilizers. Classes may be used in combination with other search terms, e.g., a Keyword Search, to further restrict results within the relevant subject area. DWPI cross-classifies entries to further ensure that patents of interest are considered when determining peer status. DWPI includes references to the International Patent Classification (IPC) system. DWPI assembles information describing a patent family, starting with the new invention (Basic patent) and adding information about patents for the same invention issued in other countries (Equivalents). Equivalent patent documents are regarded as falling within the same Classification Sections as the basic document which DWPI first classifies, except in the Engineering Sections when it may be revised if the IPC changes. In context of the present invention, the PISE system is not concerned with the particular algorithms or classification methods used by DWPI in determining peers but rather is only interested and only considers the similarity scoring provided by the Derwent service. The PISE system may also utilize the contract services information as related to attributes or sub-dimensions comprising the Derwent service Dimension. The "Patent Dimension" may be comprised of two sub-dimensions, e.g., "Patent Classifications" and "Patent Titles." Using this classification, the Derwent service may provide to the PISE system a list of peers based on similarity in patent assets based on classification assigned to the respective patent assets.

Figure 8:
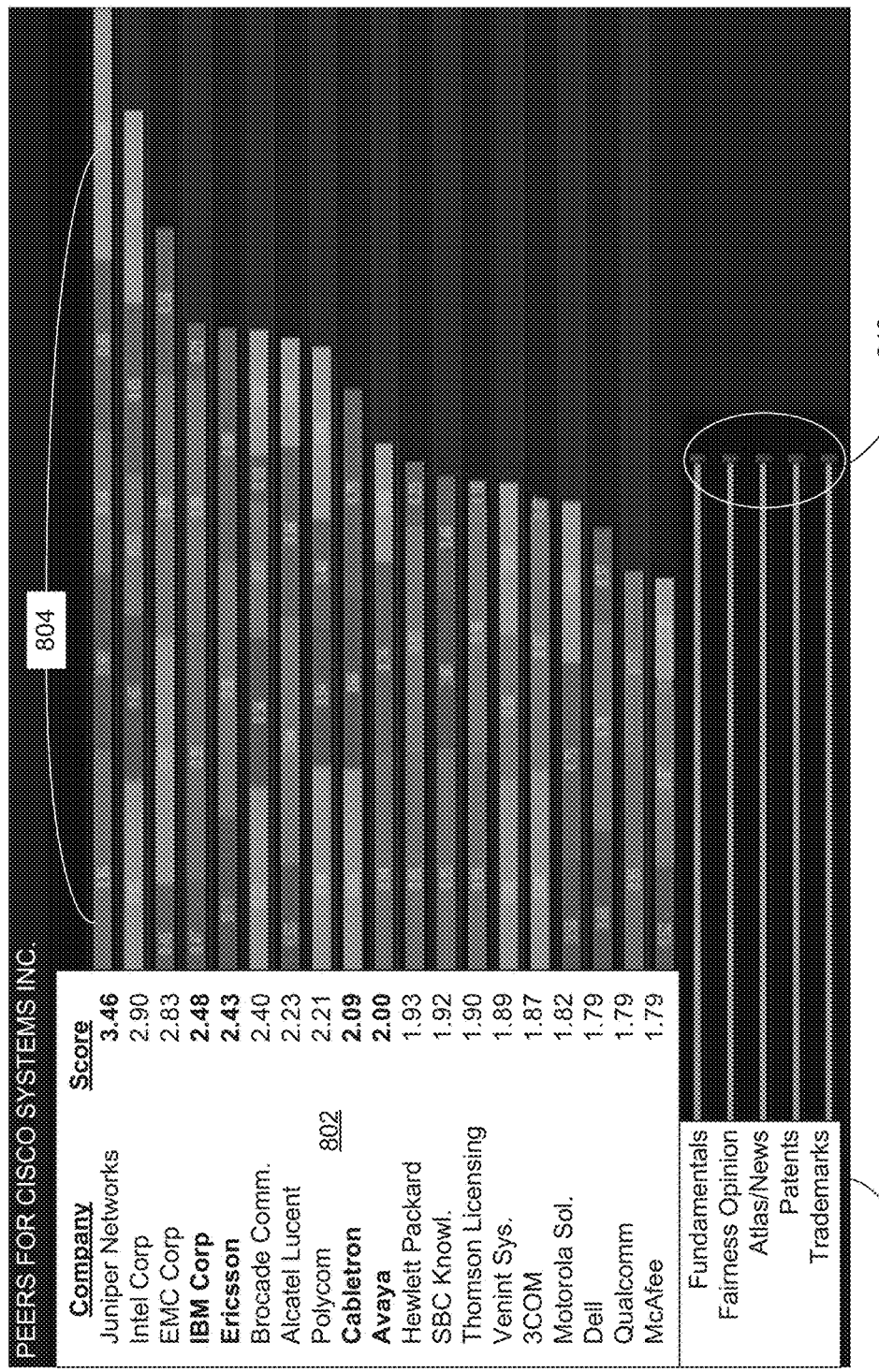
FIG. 8 is a first exemplary screen shot illustrating a user interface for displaying peer lists and overall scores along with dimension representations in accordance with the present invention PISE system.

FIG. 8 provides an exemplary screen shot of a user interface used in connection with delivery of the PISE system services. The screen shot illustrates the results of a user search using the PISE system for peer companies related to Cisco Systems Inc. User interface 800 includes a list of companies 802 determined by operation of the PISE system to be peers of Cisco and are shown along with respective composite similarity or peer scores. The overall or composite score represents an aggregated similarity score comprising component dimension scores. In this example the highest rated peer of Cisco is Juniper Networks with an aggregated score of 3.46. The aggregated score is comprised of component scores associated with dimensions included in the PISE engine operation. In this case, list 806 represents the list of dimensions used—Fundamentals, Fairness Opinions, Atlas/News, Patents and Trademarks. Sliders 810 are provided to allow the user to change the weighting or effect of each dimension. As shown in this screen shot, the sliders have not been moved from a full weighting position—which is typically the initial condition of a search. Moving a slider away from the 100% position has the effect of reducing the significance of the service linked with that slider, and its delivered similarity score, that is linked to that dimension. As a result of changing the sliders off 100% the PISE system will re-process the service inputs and may alter the original list of peer companies, i.e., removing some and adding others or it may just re-rank or re-position companies within the list due to changes in the similarity scores. In addition, a set of dynamic user interface elements, e.g., checkboxes, may be included next to each peer company on the list 802. The user may deselect one or more of the companies from the list and rerun the search—again altering the list through addition, subtraction and/or re-ranking.

Figure 9:
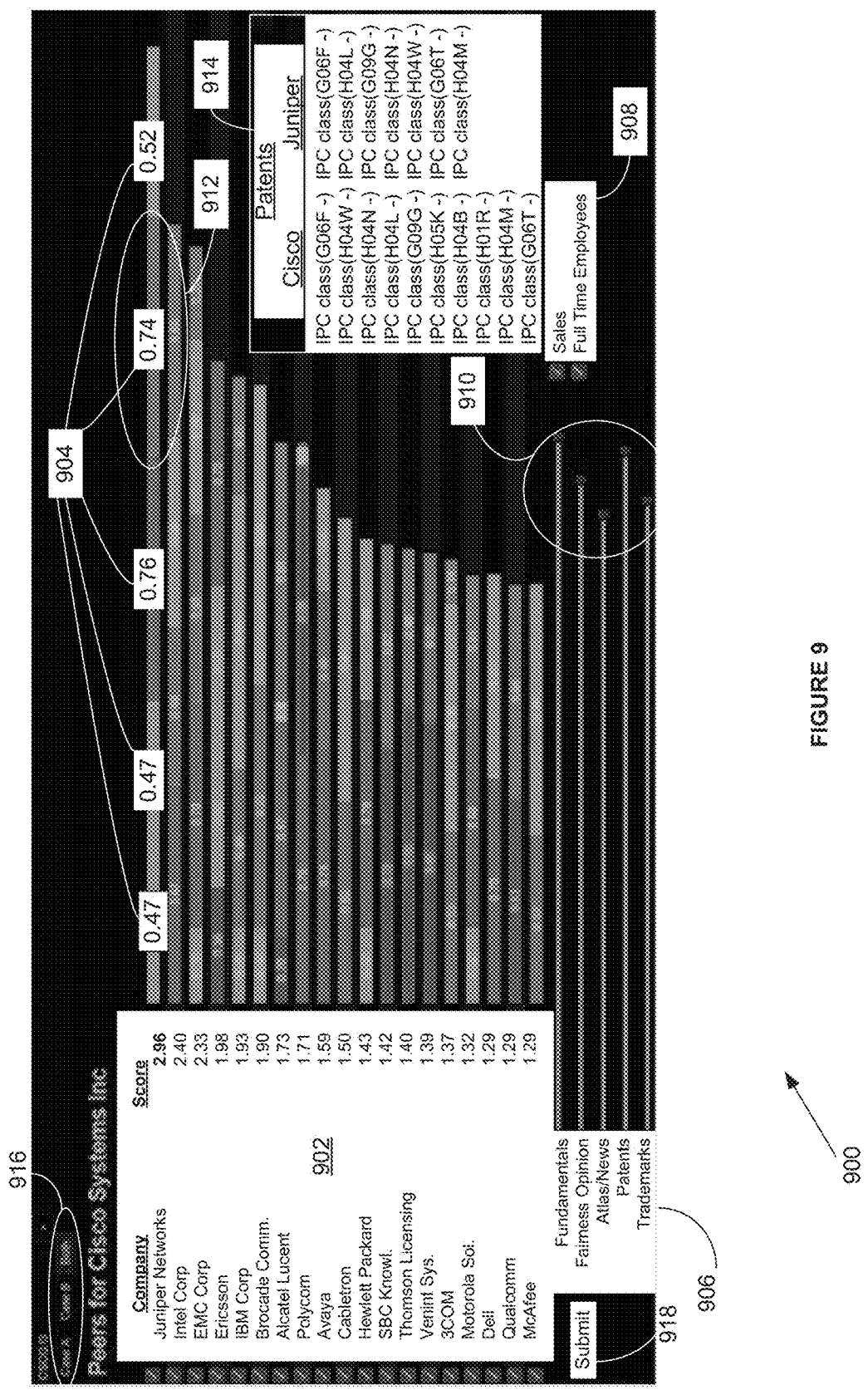
FIG. 9 is a second exemplary screen shot illustrating a user interface for displaying peer lists and overall scores along with dimension representations in accordance with the present invention PISE system.

FIG. 9 provides an exemplary screen shot of a user interface used in connection with delivery of the PISE system services. The screen shot illustrates the results of a user search using the PISE system for peer companies related to Cisco Systems Inc. User interface 900 includes a list of companies 902 determined to be peers of Cisco along with the composite similarity or peer score—an aggregated overall similarity score. In this example the highest rated peer of Cisco is Juniper Networks with an aggregated score of 2.95. The aggregated score is comprised of component scores associated with dimensions included in the PISE engine operation. In this case, list 906 represents the list of dimensions used—Fundamentals, Fairness Opinions, Atlas/News, Patents and Trademarks. Sliders 910 are provided to allow the user to change the weighting or effect of each dimension. As shown in this screen shot, the sliders have been moved from a full weighting position—which is typically the initial condition of a search. In this instance the solders have been adjusted to reduce the weight assigned to several of the dimensions. As described above, this has the effect of reducing the significance of those services, and their delivered similarity scores, that are linked to those dimensions. The original list of peer companies, i.e., the list 802 of FIG. 8 prior to the user having adjusted sliders 910, had a different ranking of peer companies (see IBM/Ericsson and Cabletron/Avaya order) and different scores. List 902 includes a checkbox next to each peer company. The user may deselect one or more of the companies from the list and rerun the search such as by clicking on the "Submit" button 918. In addition to removing the detected entities from the subsequent results list, the PISE system may deliver this detection as a signal to one or more of the underlying services, which may use this user feedback as a form of training to its peer similarity scoring or detecting model. By sliding the slider to 0 or nil weight the user has in effect removed the dimension from the similarity scoring algorithm.

Figure 11:
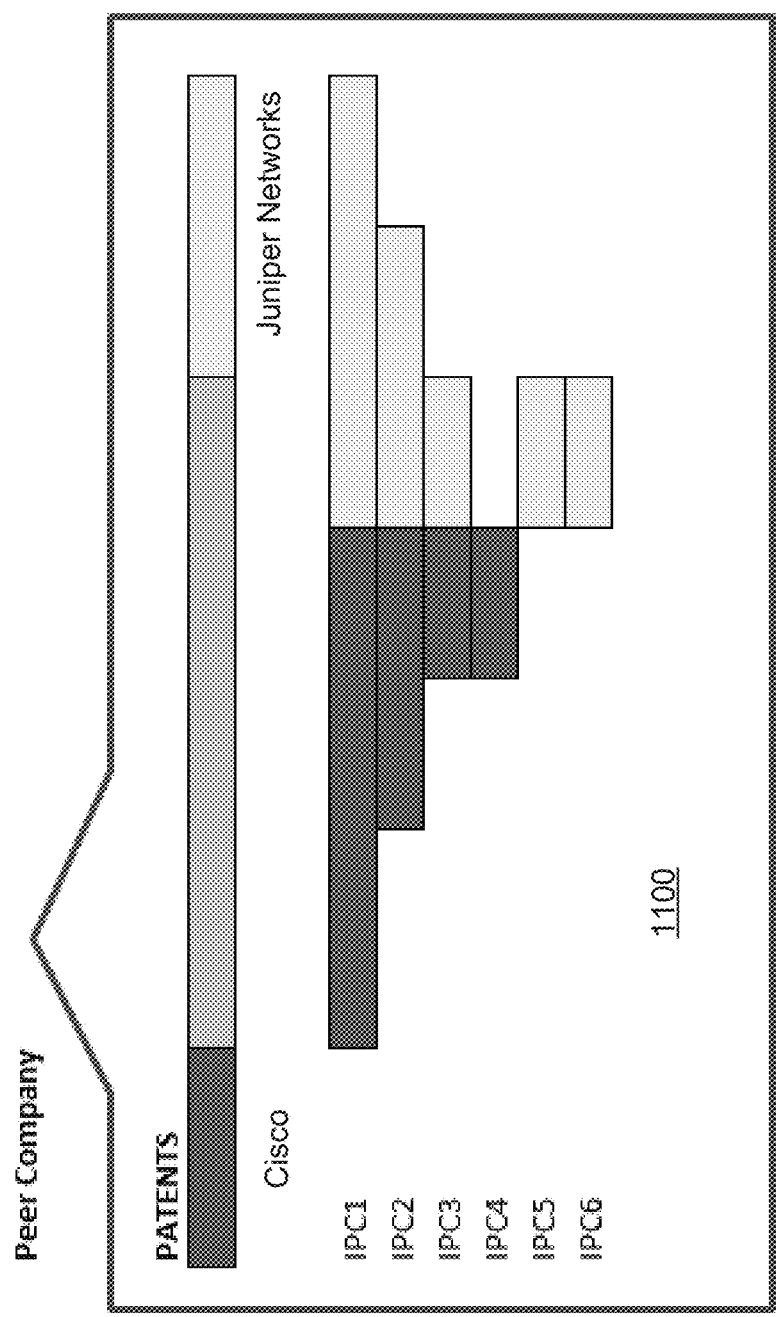
FIG. 11 represents a graphic visualization of patent classification attribute comparison of a search entity and a determined peer entity.

In this example, Juniper Networks is the highest rated peer entity to Cisco given the dimensions and services used in by the PISE system. Juniper Networks has an aggregate or overall score of 2.95 and is represented in the bar graph comprised of component dimension scores of 0.47 for fundamentals dimension, 0.47 for fairness opinion dimension, 0.76 for Atlas/News dimension, 0.74 for patents dimension, and 0.52 for trademark dimension. Moving the sliders 910 will most likely result in changes to the component scores associated with each dimension. Additional attributes 908 are shown for dimensions of sales and full time employees that do not include sliders and can only be selected or deselected for computation. Table 914 is an exemplary user interface element invoked by, for example, hovering or clicking the cursor over a component dimension score. In this example the cursor is over the patent component 912 for Juniper Networks and the resulting table 914 presents a listing of IPC International Patent Classification codes for Cisco and Juniper Networks. FIG. 11 illustrates an alternative visualization of the respective patent holdings by class for the search entity Cisco and the peer entity Juniper Networks, again, for example, by hovering the cursor over the dimension score 912 associated with the peer entity in the user interface of FIG. 9.

Figure 10:
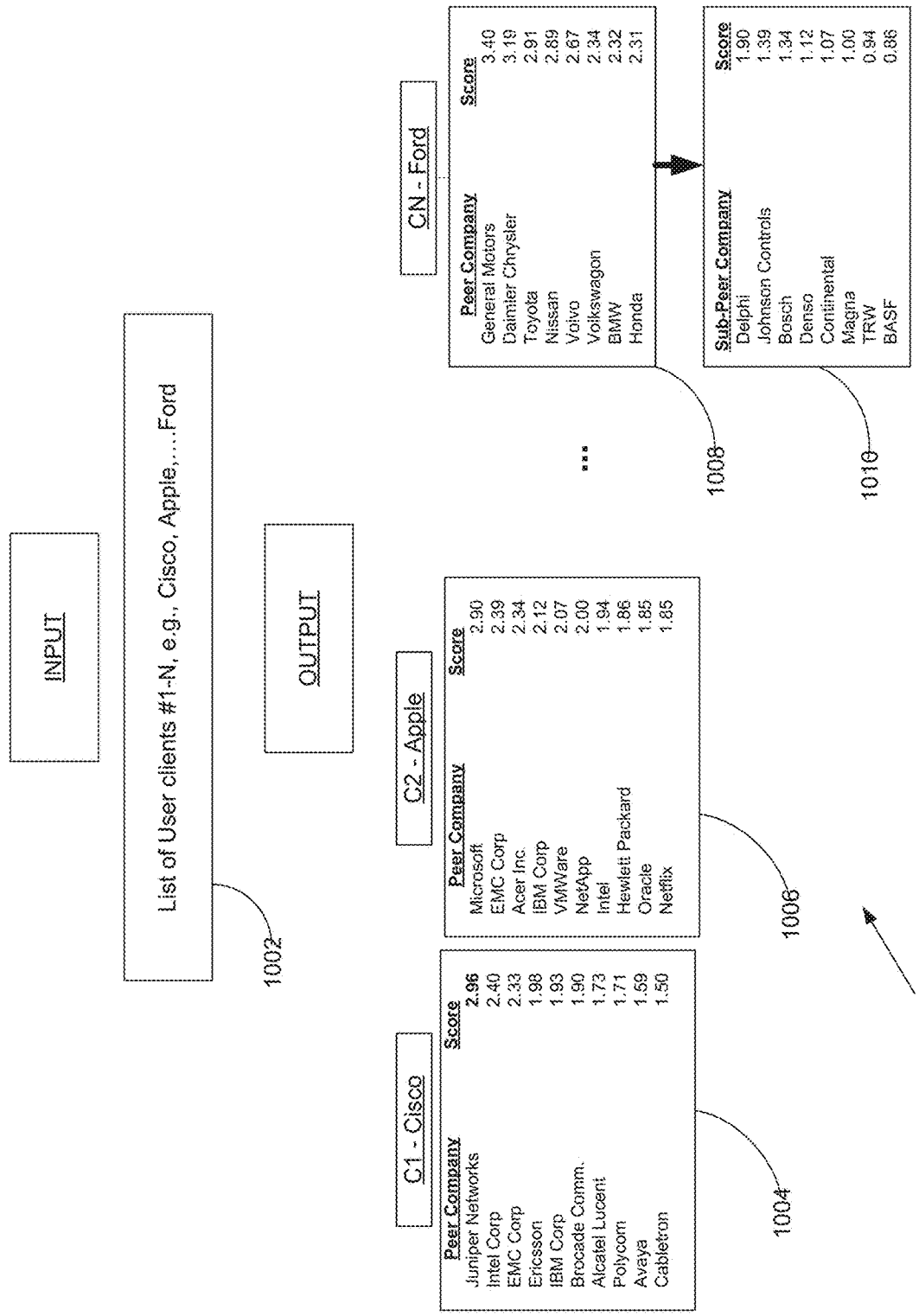
FIG. 10 is a schematic drawing illustrating a set of clusters yielded in accordance with a clustering aspect of the present invention PISE system.

FIG. 10 illustrates an exemplary schematic diagram of a set of clusters 1000 resulting from operation of the PISE system with an input 1002 of a set of multiple entities for searching for peer entities. For example, a user may be a professional services provider with an existing set of clients and is interested in identifying additional like or similar entities as potential clients. In this example a list of search entities is input into PISE system comprising Cisco, Apple, and Ford. The PISE system groups peer results around each respective input entity from the input set of entities. In this case the resulting output are clusters C1-CN. Cluster C1 1004 relates to the input entity Cisco and is comprised of the set of peer companies determined to be most similar to Cisco based on the Dimensions used and the services called. Similarly, cluster C2 1006 represents peer companies found to be most similar to input entity Apple and cluster CN represents peer companies found to be most similar to input entity Ford. In the case of Ford, the example shows a secondary cluster 1010 related to suppliers of automobile products and comprised of sub-peer entities. For instance, in determining peer similarity the PISE system may identify a closely grouped or clustered set of entities, such as parts suppliers to a recognized industry leader, related to the primary cluster of actual peer entities.

In the case of entities having multiple business units and multi-national business units, the PISE system may include the function of segregating the entity into its component business unit parts and, then use the dimension aggregator and enlisted services to identify peers and to cluster peers on a business unit basis. For example, General Electric Company is a large multi-national concern having many discrete business units that separately report operations and financial data. Services may separately follow and report on an entity's performance on a business unit basis. In this example, the PISE system may perform separate peer identification search and calculations for each of GE's appliances, industrial, financial, aerospace, and energy/power businesses/markets. In determining peer lists and overall similarity scoring the PISE system may present for display clusters of peers for each of the business units identified and searched. Accordingly, the PISE system may utilize one or both of pre-search clustering and post-search clustering.

Although often discussed herein in terms of corporate entities as the subject of the search and peer entities as the objects of the search returned to the user, the invention is not limited to companies and may be used to input as entities individuals, persons, places, animals, products, pharmaceuticals, investments, investors, industry groups, commodities, indexes, classified groups. Further, dimensions or attributes may include language(s), education, work history, positions held, age, organizational memberships, residence locations, client history, and other personal attributes associated with entities that may be useful in determining peers of the individual.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-based system connected via a communications network to a remote user device and a plurality of services, the system comprising:
    a computer system having a processor and a memory and being connected to a digital communications interface for communicating with a remote user device and a plurality of services via a digital communications network, the computer system adapted to execute instructions;
    the digital communications interface comprising:
        an input operably connected to the computer system and adapted to receive from the remote user device via the digital communications network a query;
        an entity identification module operably connected to the computer system and adapted to identify within the query an entity and associate an entity identifier with the identified entity;
        an output operably connected to the computer system and adapted to transmit the entity identifier to a plurality of service providers;
        the input further adapted to receive from each of the plurality of service providers a set of peer information, each set of peer information comprising a list of peers and a set of similarity scores and having an associated set of attributes, each set of peer information being determined based on separate peer determination models and on the entity identifier;
    a dimension aggregation engine adapted to receive a plurality of service input signals and to link the plurality of service input signals to one or more dimensions based on a set of dimensions mapped to each of the plurality of service providers based on technical contract data associated with each respective service provider, the dimension aggregator further adapted to normalize each of the signals received from the set of service providers resulting in a set of normalized service signals and to aggregate the set of normalized service signals to determine a set of overall similarity scores based on aggregating all of the received sets of peer information associated with the entity to produce an aggregated list of peers; and
    a graphic user interface adapted to present a graphic representation of the aggregated list of peers based on the computed set of overall similarity scores associated with the entity on a display device associated with the remote user device, wherein the graphical representation includes an overall similarity score representation for each peer entity in the list of peers and each overall similarity score representation includes a representation of the set of dimension scores included in the overall similarity score, and wherein the graphical user interface includes a sub-dimension user interface element adapted to allow a user to open a view related to at least one of the set of dimension scores.

2. The system of claim 1, wherein the entity identifier represents one from a group consisting of: a public company, a private company, a client, a customer, a person, an office of a company, a person having a defined role with an entity.

3. The system of claim 1, wherein the input is adapted to receive a query comprising a plurality of entities, and further comprising a clustering engine adapted to transmit a plurality of entity identifiers to the plurality of service providers.

4. The system of claim 1 wherein the input is adapted to receive an input from a graphical user interface element; the dimension aggregation engine is adapted to modify the overall similarity scores based on the input received from the graphical user interface element and generate a modified overall similarity score; and the graphic user interface is adapted to present a modified list of peers based on the modified overall similarity scores.

5. The system of claim 4, wherein the graphical user interface element is one of the group consisting of: a bar graph; a slide; a check box; a virtual dial; and a numerical input box.

6. The system of claim 1 wherein the input is adapted to receive an input from the sub-dimension graphical user interface element; the dimension aggregation engine is adapted to modify the overall similarity scores based on the input received from the sub-dimension graphical user interface element and generate a modified overall similarity score; and the graphic user interface is adapted to present a modified list of peers based on the modified overall similarity scores.

7. The system of claim 1 wherein the digital communications interface is adapted to communicate to one or more of the services user inputs received via the graphical user interface indicating a feedback based on the list of peers presented via the remote user device, the feedback for use by the one or more services in a learning mode.

8. The system of claim 1 wherein the plurality of services includes two or more from the group of service types consisting of: corporate fundamentals, patent classification, trademark classification, business classification, financial analyst coverage, individual authority database.

9. A digital communications system for determining a set of peer entities related to at least one entity of interest, the digital communications system comprising:
    a server having a processor and a memory and being connected to a network communications interface for communicating with remote devices over a communications network, the server adapted to execute instructions;

an input operably connected to the server and adapted to receive an input signal from a remote user device via the communications network, the input signal representing an input search query for an entity of interest;

a handshake module adapted to map each one of the set of service providers to a respective set of dimensions based on technical contract data associated with each respective service provider;

a dimension aggregator adapted to receive a plurality of service input signals and to link the plurality of service input signals to one or more dimensions based on the mapped set of dimensions, the dimension aggregator further adapted to normalize each of the signals received from the set of service providers resulting in a set of normalized service signals and to aggregate the set of normalized service signals to determine a set of overall peer similarity scores based on a set of aggregator dimensions and to produce an aggregated set of peer entities;

a graphical user interface module adapted to generate a graphical user interface for display via a remote user device connected to the server via the network interface, the graphical user interface including a section for displaying the aggregated set of peer entities and including an element adapted for user manipulation to change one or more attributes associated with the set of dimensions, wherein upon receiving an input signal from the remote user device as a result of a user manipulation the dimension aggregator produces a modified aggregated set of peer entities.

10. The digital communications system of claim 9 further comprising a peer cluster module adapted to cluster the set of peer entities into at least two cluster groups.

11. The digital communications system of claim 9 further comprising a peer cluster module adapted to cluster the set of peer entities into at least two cluster groups.

12. The digital communications system of claim 9 wherein the dimension aggregator is adapted to modify the overall peer similarity scores based on the input received from the graphical user interface element and generate a modified overall similarity score; and the graphic user interface is adapted to present the modified aggregated set of peer entities based on the modified overall similarity scores, wherein the graphical user interface element is one of the group consisting of: a bar graph; a slide; a check box; a virtual dial; and a numerical input box.

13. The digital communications system of claim 9 wherein the graphical user interface includes an overall similarity score representation for each peer entity in the aggregated set of peer entities and each overall similarity score representation includes a representation of a set of dimension scores included in the overall similarity score.

14. The digital communications system of claim 13 wherein the graphical user interface includes a sub-dimension user interface element adapted to allow a user to open a view related to at least one of the set of dimension scores.

15. The digital communications system of claim 14 wherein the input is adapted to receive an input from the sub-dimension graphical user interface element; the dimension aggregation engine is adapted to modify the overall peer similarity score based on the input received from the sub-dimension graphical user interface element and generate a modified overall peer similarity score; and the graphic user interface is adapted to present a modified aggregated set of peer entities based on the modified overall similarity score.

16. The digital communications system of claim 9 wherein the digital communications interface is adapted to communicate to one or more of the set of service providers a signal representing a user feedback related to the user inputs received via the graphical user interface indicating either or both of a positive or negative feedback related to the aggregated set of peer entities presented via the remote user device.

17. The digital communications system of claim 16 wherein the positive or negative feedback is in the form of selecting or deselecting entities from the aggregated set of peer entities.

18. The system of claim 9, further comprising:
wherein the input signal includes either or both of a positive or negative indication concerning entities other than the entity of interest to include or exclude as peers; and
a service communications interface adapted to send a request signal representing an entity of interest derived from the input query to each of the set of service providers to initiate a search for peer entities, the request signal also including an indication of entities to include or exclude as peers based on the positive or negative indication.

19. A digital communications interface in electrical communication with a plurality of service providers via a communications network and connected to a computer-based peer identification system having a processor and a memory and communicating with the plurality of service providers via the communications network, the peer identification system having an input for receiving an input query from a remote user device and adapted to execute instructions for determining a set of peer entities related to at least one entity of interest, the digital communications interface comprising:

a service communications interface operably connected to the peer identification system and adapted to send a request signal representing an entity derived from the input query to each of a set of service providers to initiate a search for peer entities related to the entity, and further adapted to receive a response signal from each of the set of service providers in response to the request signal, each response signal representing a resulting set of peer data generated respectively by the set of service providers based on the entity and a set of service dimensions included in a technical contract for each of the set of service providers;

a handshake module operably connected to the peer identification system and adapted to map each one of the set of service providers to a respective set of dimensions based on technical contract data associated with each respective service provider;

a service signal normalization module operably connected to the peer identification system and adapted to normalize each of the signals received from the set of service providers resulting in a set of normalized service signals;

a dimension aggregation engine operably connected to the peer identification system and adapted to aggregate the set of normalized service signals to determine a set of overall peer identification scores based on a set of aggregator dimensions and to produce an aggregated set of peer entities;

a graphical user interface adapted to generate a graphical user interface for display via a remote user device connected to the peer identification system, the graphical user interface including a section for displaying the aggregated set of peer entities based on the set of overall peer identification scores and including an element adapted for user manipulation to generate a user manipulation signal, whereby in response to the user manipulation signal the dimension aggregator produces a modified set of overall peer identification scores different that the set of overall peer identification scores.

20. The digital communications interface of claim 19 further comprising a peer cluster module adapted to cluster the set of peer entities into at least two cluster groups.

21. The digital communications interface of claim 19 wherein the service communications interface is adapted to send a request signal representing a plurality of entities derived from the input query to each of a set of service providers to initiate a search for peer entities related to the plurality of entities.

22. The digital communications interface of claim 21 wherein the dimensions aggregation engine is adapted to determine a set of overall peer identification scores for each one of the plurality of entities.

23. The digital communications interface of claim 22 further comprising a peer cluster module adapted to cluster the set of peer entities into at least two cluster groups wherein the dimensions aggregation engine is adapted to determine a set of overall peer identification scores and an aggregated set of peer entities for each one of the plurality of entities.

24. The digital communications interface of claim 19 wherein the input is adapted to receive an input from a graphical user interface element; the dimension aggregation engine is adapted to modify the overall similarity scores based on the input received from the graphical user interface element and generate a modified overall similarity score; and the graphic user interface is adapted to present a modified list of peers based on the modified overall similarity scores, wherein the graphical user interface element is one of the group consisting of: a bar graph; a slide; a check box; a virtual dial; and a numerical input box.

25. The digital communications interface of claim 19 wherein the graphical representation includes an overall similarity score representation for each peer entity in the list of peers and each overall similarity score representation includes a representation of the set of dimension scores included in the overall similarity score.

26. The digital communications interface of claim 25 wherein the graphical user interface includes a sub-dimension user interface element adapted to allow a user to open a view related to at least one of the set of dimension scores.

27. The digital communications interface of claim 26 wherein the input is adapted to receive an input from the sub-dimension graphical user interface element; the dimension aggregation engine is adapted to modify the overall similarity scores based on the input received from the sub-dimension graphical user interface element and generate a modified overall similarity score; and the graphic user interface is adapted to present a modified list of peers based on the modified overall similarity scores.

28. The system of claim 19 wherein the digital communications interface is adapted to communicate to one or more of the services a signal representing a user feedback related to the user inputs received via the graphical user interface indicating either or both of a positive or negative feedback related to the list of peers presented via the remote user device.

29. The system of claim 28 wherein the positive or negative feedback is in the form of selecting or deselecting entities from the list of peers.

30. The system of claim 19 wherein the input query includes either or both of a positive or negative indication concerning entities other than the entity of interest to include or exclude as peers, and wherein the service communications interface is adapted to send a request signal representing an entity of interest derived from the input query to each of a set of service providers to initiate a search for peer entities, the request signal also including an indication of entities to include or exclude as peers based on the positive or negative indication.

* * * * *